US008473412B2

(12) United States Patent
Huff et al.

(10) Patent No.: US 8,473,412 B2
(45) Date of Patent: Jun. 25, 2013

(54) REMOTE CAPTURE OF MULTIPLE DEPOSIT ITEMS

(75) Inventors: Lowell Robert Huff, St. Louis, MO (US); Zhongmin Agarwal, Charlotte, NC (US); David Todd Frew, Fort Mill, SC (US)

(73) Assignee: Bank of America Corporation, Charlotte, NC (US)

( * ) Notice: Subject to any disclaimer, the term of this patent is extended or adjusted under 35 U.S.C. 154(b) by 182 days.

(21) Appl. No.: 12/846,208

(22) Filed: Jul. 29, 2010

(65) Prior Publication Data

US 2012/0030117 A1    Feb. 2, 2012

(51) Int. Cl.
*G06Q 40/00* (2012.01)
*G06Q 20/10* (2006.01)
*G06Q 40/06* (2006.01)

(52) U.S. Cl.
CPC .............. *G06Q 20/10* (2013.01); *G06Q 40/00* (2013.01); *G06Q 40/06* (2013.01)
USPC ................... 705/39; 705/35; 705/42; 705/45

(58) Field of Classification Search
CPC ...................................... G06Q 40/00
USPC ............................... 705/42, 35, 39
See application file for complete search history.

(56) References Cited

U.S. PATENT DOCUMENTS

| 7,216,106 | B1 * | 5/2007 | Buchanan et al. | 705/45 |
| 7,900,822 | B1 * | 3/2011 | Prasad et al. | 235/379 |
| 2002/0152166 | A1 | 10/2002 | Dutta et al. | |
| 2009/0147988 | A1 * | 6/2009 | Jones et al. | 382/100 |
| 2009/0185241 | A1 | 7/2009 | Nepomniachtchi | |
| 2009/0185736 | A1 | 7/2009 | Nepomniachtchi | |
| 2009/0185737 | A1 | 7/2009 | Nepomniachtchi | |
| 2009/0185738 | A1 * | 7/2009 | Nepomniachtchi | 382/140 |
| 2010/0150424 | A1 | 6/2010 | Nepomniachtchi et al. | |

OTHER PUBLICATIONS

U.S. Appl. No. 13/005,331, Agarwal et al.
USAA Deposit@Mobile iPhone App USAA (https://www.usaa.com/inet/ent_utils/McStaticPages?key=mobile_banking_dm), downloaded Jan. 5, 2011.

* cited by examiner

*Primary Examiner* — Ella Colbert
*Assistant Examiner* — Scott S Trotter
(74) *Attorney, Agent, or Firm* — Michael A. Springs; Moore & Van Allen PLLC; Sreenivas Vedantam

(57) ABSTRACT

Embodiments of the present invention relate to methods and apparatuses for processing an image that shows multiple deposit items, where the image was captured by a remote capture device. For example, some embodiments provide a method that includes: (a) receiving an image that shows multiple deposit items, where the image was captured by a remote capture device; (b) identifying, based at least partially on the image, deposit item information associated with the multiple deposit items; and/or (c) crediting an account based at least partially on the deposit item information.

38 Claims, 9 Drawing Sheets

REMOTE CAPTURE OF MULTIPLE DEPOSIT ITEMS

FIELD

In general terms, embodiments of the present invention relate to methods and apparatuses for processing an image that shows multiple deposit items, where the image was captured by a remote capture device.

BACKGROUND

Today, most financial institutions require their customers to visit traditional deposit locations, such as banking centers, automated teller machines (ATMs), and the like, in order to deposit cash, checks, and/or other deposit items. However, traveling to and from a traditional deposit location in order to make a deposit is increasingly viewed by financial institution customers as burdensome, time-consuming, and wasteful. Thus, there is a need to provide methods and apparatuses that enable financial institution customers to engage in deposit transactions in ways that are easier, more efficient, and less costly than the ways disclosed in the prior art.

SUMMARY OF SELECTED EMBODIMENTS OF THE PRESENT INVENTION

In general terms, embodiments of the present invention are directed to the concept of depositing multiple deposit items in a single deposit transaction by capturing an image of the multiple deposit items with a remote capture device (e.g., a camera phone, flatbed scanner, etc.) and then crediting an account based at least partially on that image. As such, the user of the remote capture device can engage in a single deposit transaction that involves multiple deposit items, all without having to travel to a traditional deposit location (e.g., banking center, ATM, etc.) and without having to capture an individual image of each deposit item involved in the deposit transaction.

For example, some embodiments of the present invention are embodied as an apparatus that includes a processor, where the processor is configured to: (a) receive an image that shows multiple deposit items, where the image was captured by a remote capture device; and (b) identify, based at least partially on the image, deposit item information associated with the multiple deposit items.

In some embodiments of the apparatus, the remote capture device includes at least one of a mobile phone, a digital camera, a portable scanner, or a component thereof. Additionally or alternatively, in some embodiments of the apparatus, the multiple deposit items include at least one of a check, a deposit slip, or a money order. Further, in some embodiments, the deposit item information includes information associated with at least one of a magnetic ink character recognition (MICR) line, an endorsement, a watermark, an account number, a payee identity, a payor identity, a financial institution identity, a deposit amount, an appearance of a deposit item, a type of a deposit item, or the number of the multiple deposit items.

In some embodiments of the apparatus, the processor is housed in the remote capture device. In other embodiments of the apparatus, the processor is housed in a server located remotely from the remote capture device. Additionally or alternatively, in some embodiments, the deposit item information includes the number of the multiple deposit items, and the processor is configured to identify the number of the multiple deposit items based at least partially on the processor identifying the number of quadrilaterals shown in the image. In other embodiments, the deposit item information includes the number of the multiple deposit items, and the processor is configured to identify the number of the multiple deposit items based at least partially on the processor identifying the number of MICR lines shown in the image.

In some embodiments of the apparatus, the processor is configured to: (a) prompt a user of the remote capture device to capture a first image of the multiple deposit items that shows the fronts of the multiple deposit items; and (b) prompt the user of the remote capture device to capture a second image of the multiple deposit items that shows the backs of the multiple deposit items.

In some embodiments, the processor is configured to prompt a user of the remote capture device to provide the number of the multiple deposit items. In other embodiments, the processor is configured to prompt a user of the remote capture device to provide the type of at least one of the deposit items in the multiple deposit items. In still other embodiments of the apparatus, the processor is configured to prompt a user of the remote capture device to provide the deposit amount of at least one of the deposit items in the multiple deposit items. Additionally or alternatively, in some embodiments, the processor is configured to prompt a user of the remote capture device to arrange the multiple deposit items in a predetermined configuration before capturing the image.

In some embodiments of the apparatus, the processor is configured to determine, based at least partially on the deposit item information, that a portion of the image represents at least part of the front or at least part of the back of a single deposit item in the multiple deposit items. For example, in some embodiments, the processor is configured to determine that the portion of the image represents the front of the single deposit item based at least partially on the processor identifying a MICR line shown in the portion of the image. As another example, in some embodiments, the processor is configured to determine that the portion of the image represents the back of the single deposit item based at least partially on the processor identifying an endorsement shown in the portion of the image.

Additionally or alternatively, in some embodiments of the apparatus, the processor is configured to: (a) receive a second image of the multiple deposit items, where the second image was captured by the remote capture device; (b) determine that a first portion of the first image and a first portion of the second image collectively represents at least part of the front and at least part of the back of a first deposit item in the multiple deposit items; and (c) determine that a second portion of the first image and a second portion of the second image collectively represents at least part of the front and at least part of the back of a second deposit item in the multiple deposit items.

In some embodiments, the processor is configured to determine that the first portion of the first image and the first portion of the second image collectively represents at least part of the front and at least part of the back of the first deposit item based at least partially on input received from a user of the remote capture device via the remote capture device. Additionally or alternatively, in some embodiments, the processor is configured to determine that the first portion of the first image and the first portion of the second image collectively represents at least part of the front and at least part of the back of the first deposit item by determining that deposit item information shown in the first portion of the first image corresponds to deposit item information shown in the first portion of the second image.

In some embodiments of the apparatus, the processor is configured to transmit the deposit item information to a server located remotely from the processor, where the server is configured to credit an account based at least partially on the deposit item information. In other embodiments of the apparatus, the processor is configured to credit an account based at least partially on the deposit item information.

As another example, some embodiments of the present invention are embodied as a method that includes: (a) receiving, by a processor, an image that shows multiple deposit items, where the image was captured by a remote capture device; and (b) identifying, using the processor and based at least partially on the image, deposit item information associated with the multiple deposit items. Additionally or alternatively, in some embodiments, the method further includes capturing, by the remote capture device, the image that shows the multiple deposit items.

As still another example, some embodiments of the present invention are embodied as a computer program product that includes a non-transitory computer-readable medium. In some embodiments, the non-transitory computer-readable medium includes computer-executable program code portions stored therein, where the computer-executable program code portions include: (a) a first program code portion configured to receive an image that shows multiple deposit items, where the image was captured by a remote capture device; and (b) a second program code portion configured to identify, based at least partially on the image, deposit item information associated with the multiple deposit items.

BRIEF DESCRIPTION OF THE DRAWINGS

Figure 1:
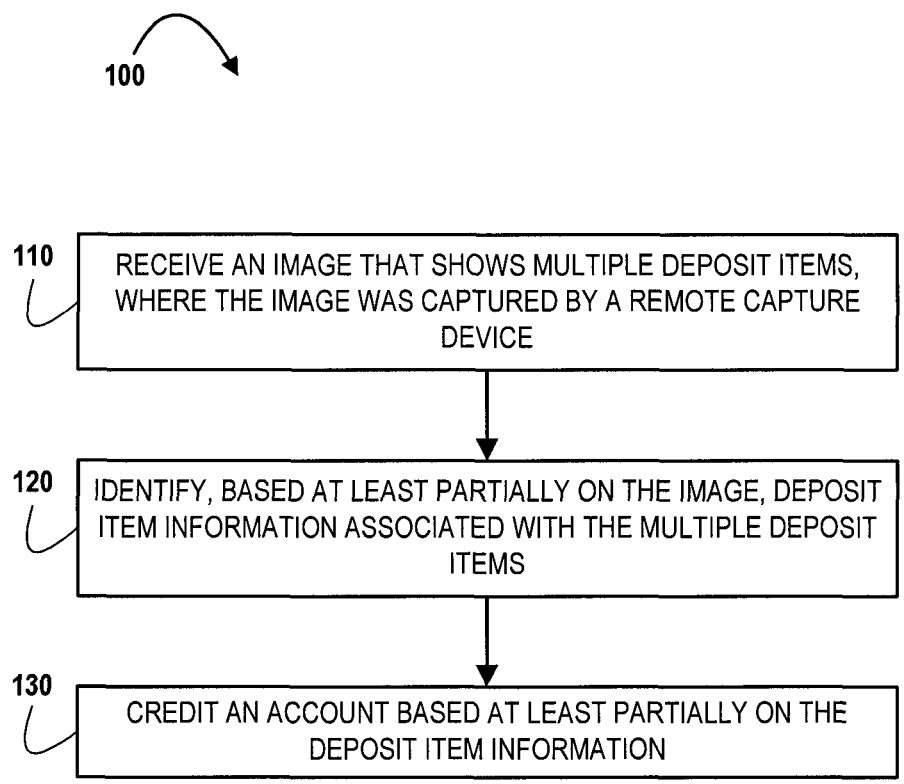
Figure 2:
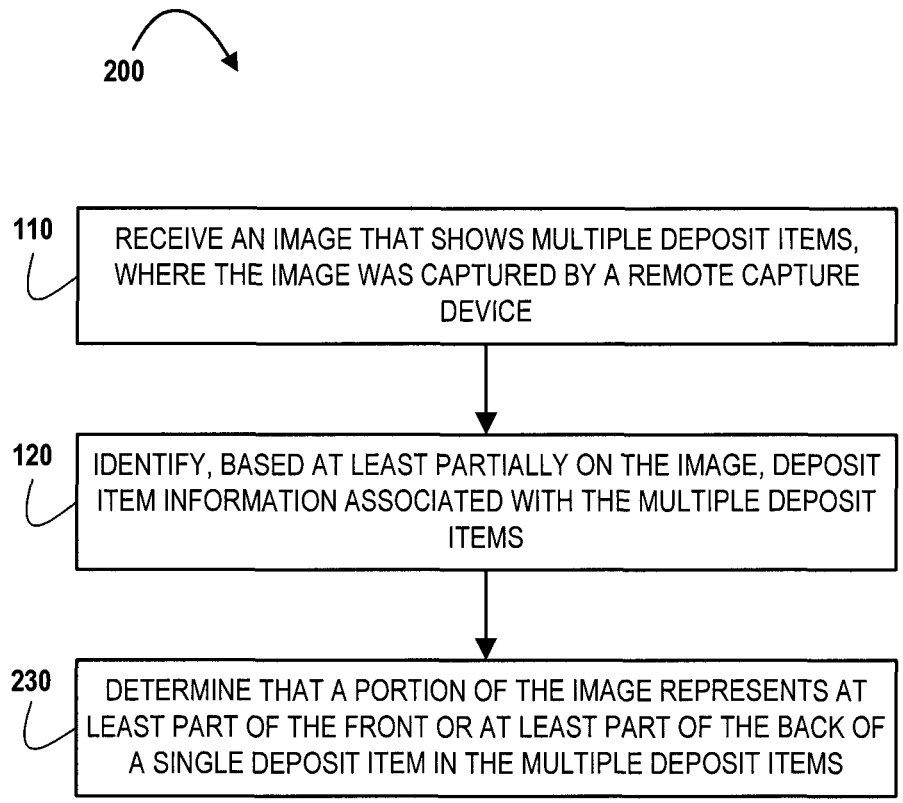
Figure 3:
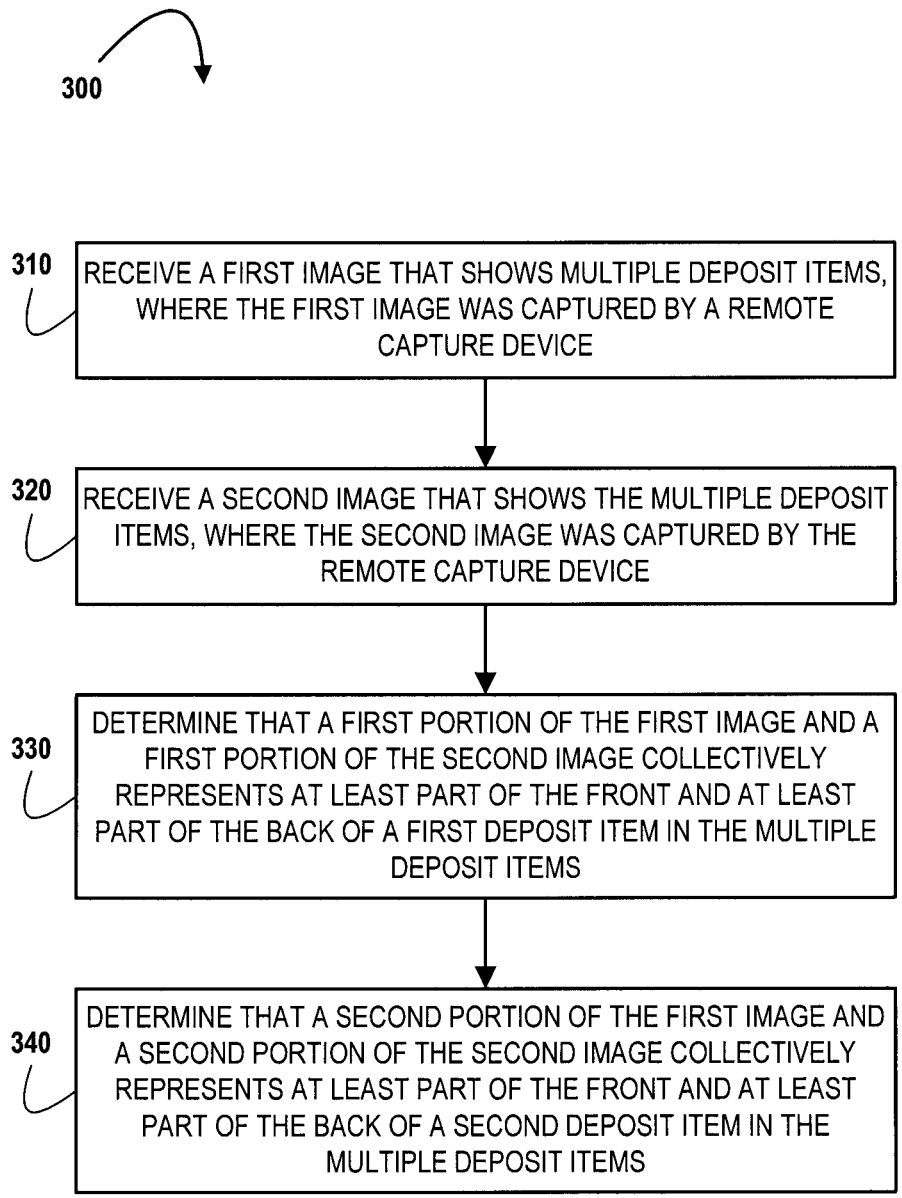
Figure 4:
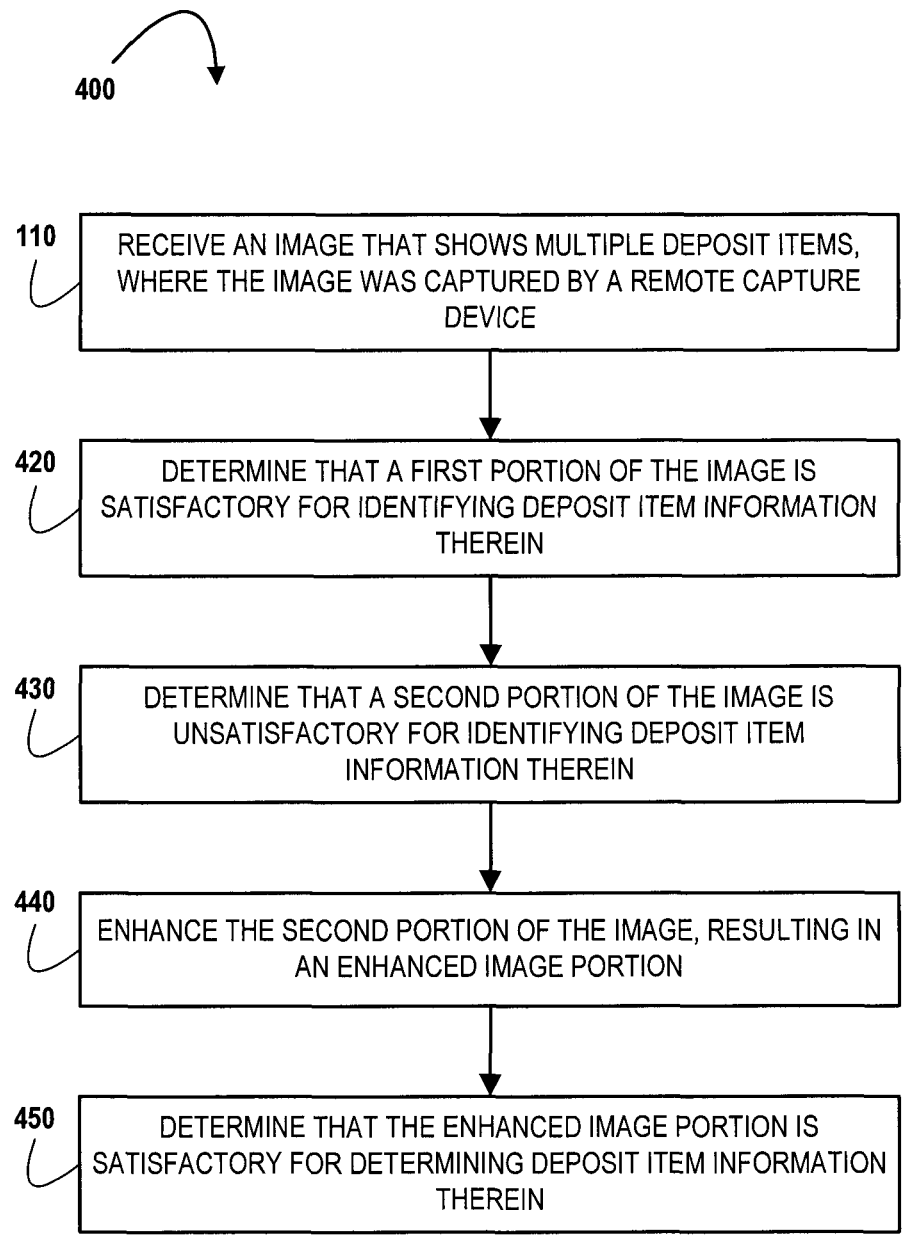
Figure 5:
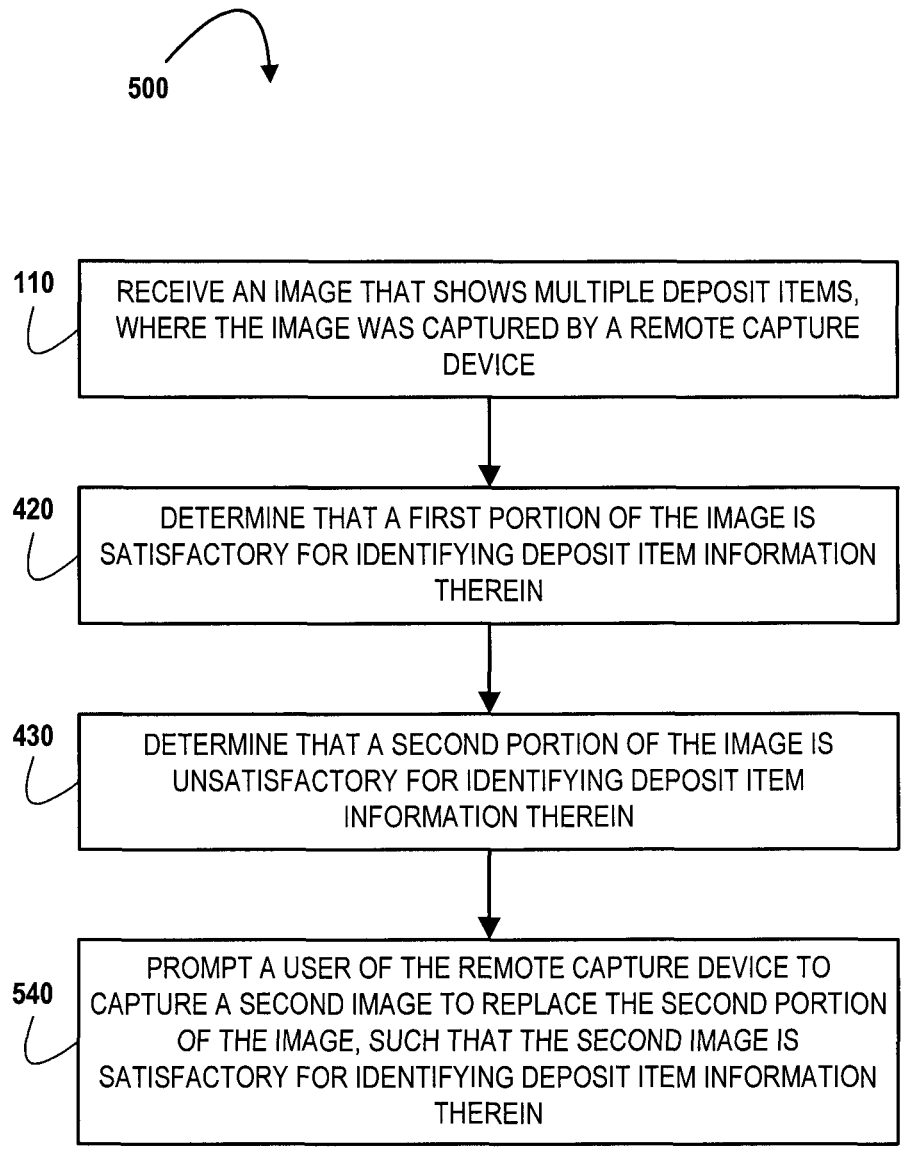
Figure 6:
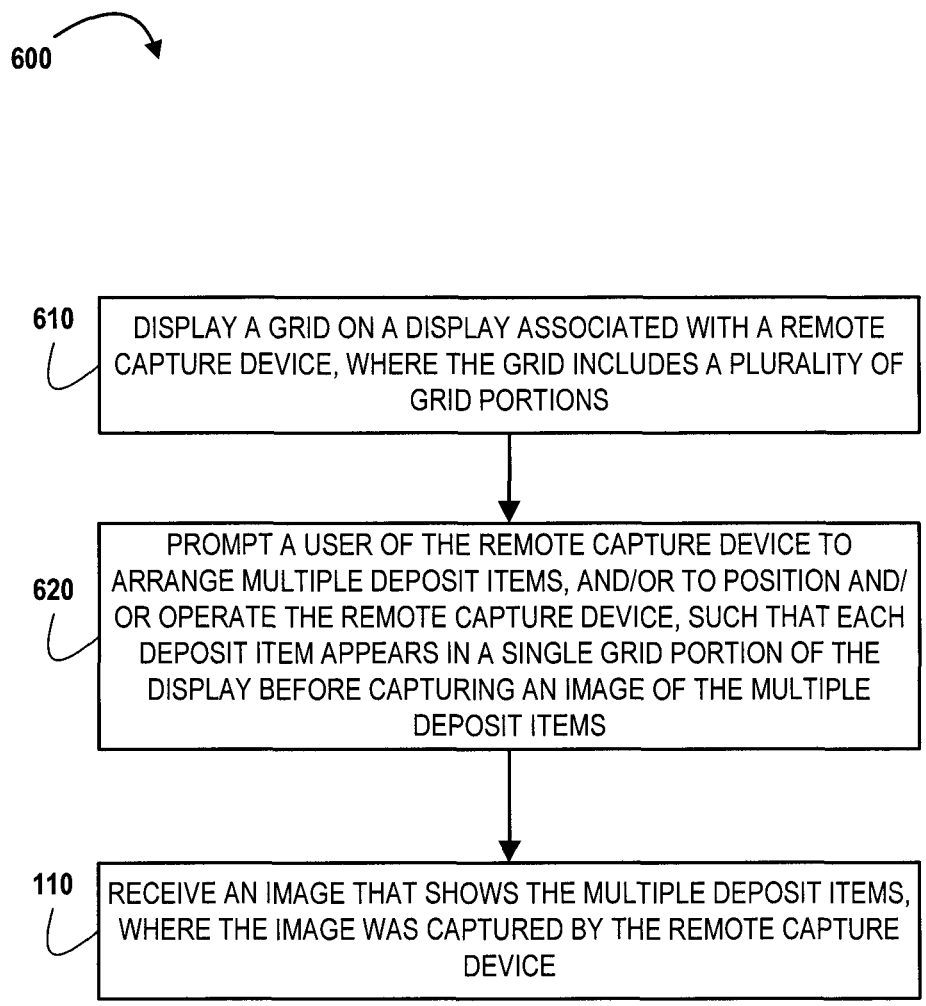
Figure 7:
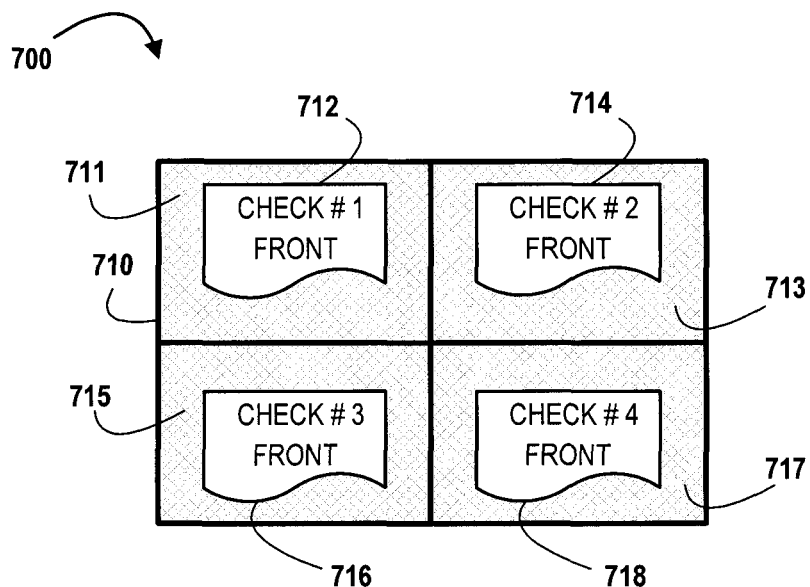
Figure 7A:
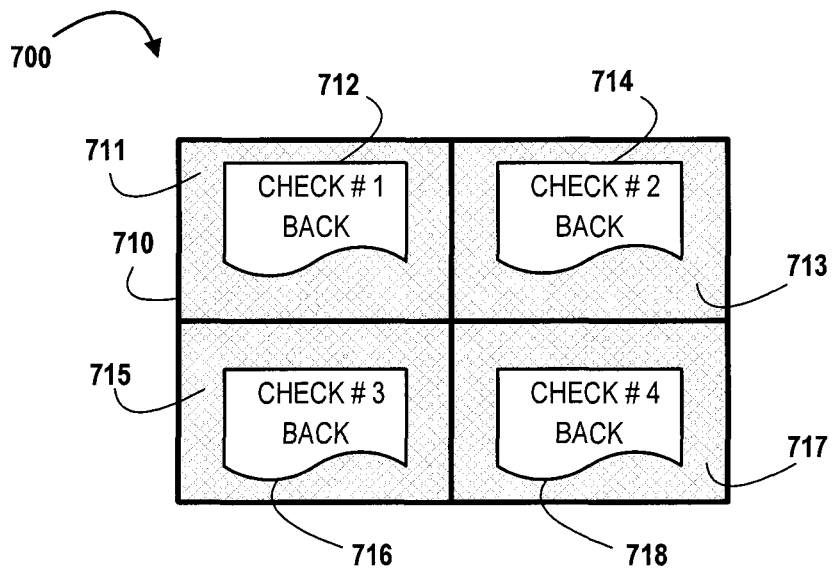
Figure 8:
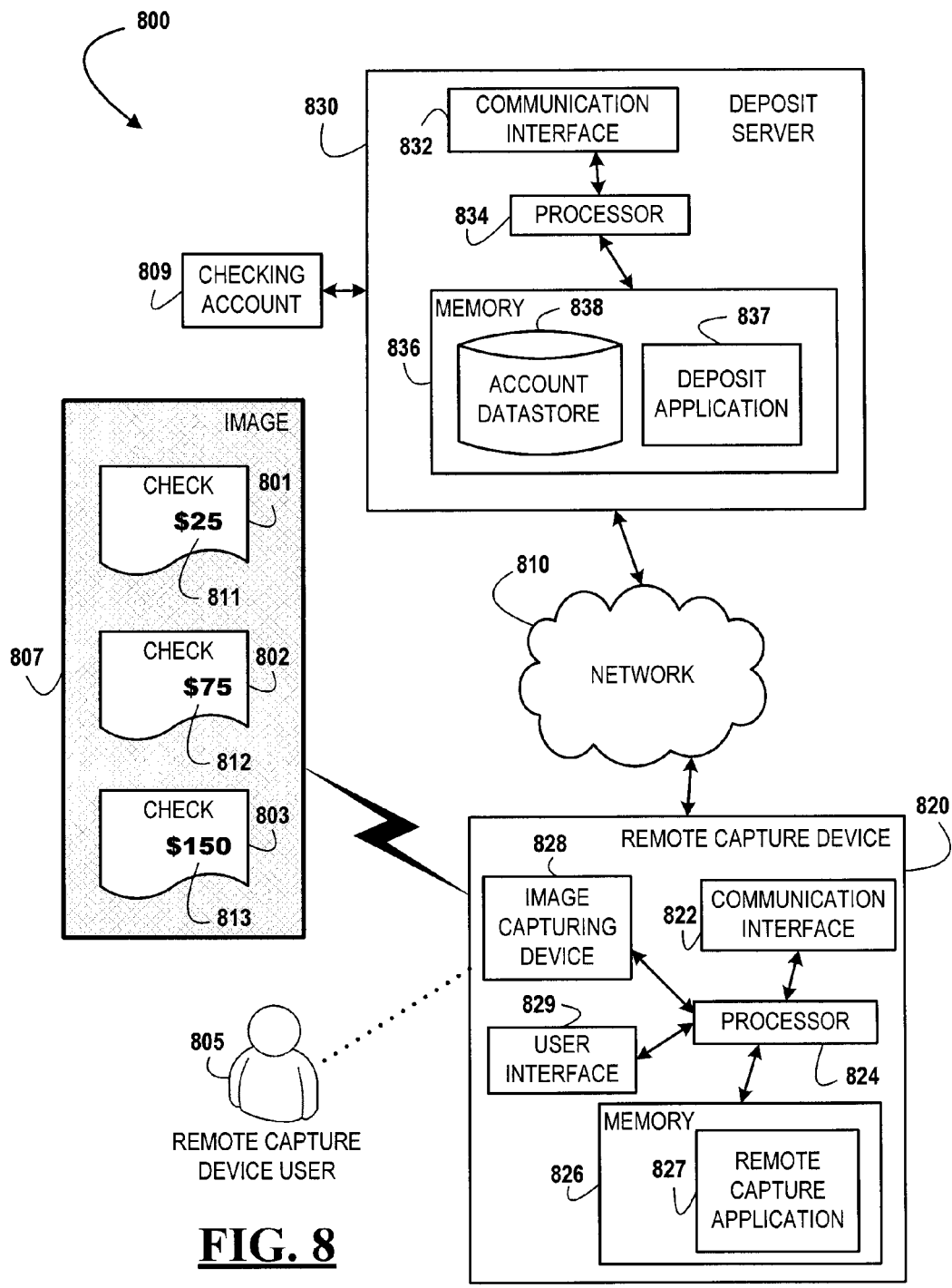
Figure 9:
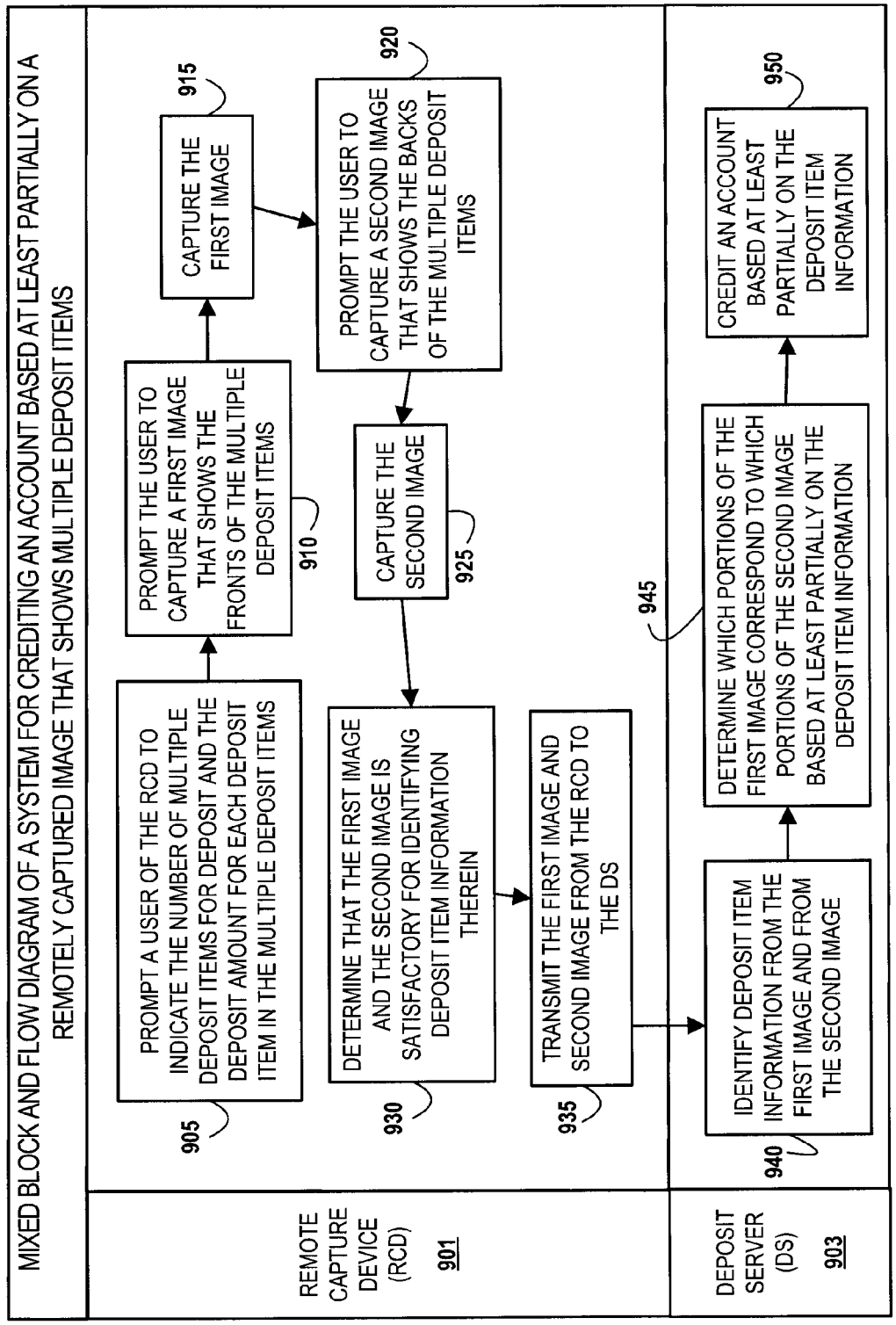

Having thus described some embodiments of the present invention in general terms, reference will now be made to the accompanying drawings, wherein:

FIG. 1 is a flow diagram illustrating a general process flow of an apparatus for crediting an account based at least partially on an image that shows multiple deposit items, where the image was captured by a remote capture device, in accordance with an embodiment of the present invention;

FIG. 2 is a flow diagram illustrating a general process flow of an apparatus for determining that a portion of an image represents at least part of the front or at least part of the back of a deposit item, in accordance with an embodiment of the present invention;

FIG. 3 is a flow diagram illustrating a general process flow of an apparatus for determining that a portion of a first image and a portion of a second image collectively represents at least part of the front and at least part of the back of a single deposit item, in accordance with an embodiment of the present invention;

FIG. 4 is a flow diagram illustrating a general process flow of an apparatus for enhancing an unsatisfactory portion of an image, in accordance with an embodiment of the present invention;

FIG. 5 is a flow diagram illustrating a general process flow of an apparatus for prompting a user of a remote capture device to capture a second image to replace an unsatisfactory portion of a first image, in accordance with an embodiment of the present invention;

FIG. 6 is a flow diagram illustrating a general process flow of an apparatus for prompting a user of a remote capture device to capture an image that shows multiple deposit items relative to a grid, in accordance with an embodiment of the present invention;

FIG. 7 is a block diagram illustrating a display associated with a remote capture device, where the display includes a grid having grid portions, and where each grid portion shows the front of a single deposit item therein before an image of the multiple deposit items is captured, in accordance with an embodiment of the present invention;

FIG. 7A is a block diagram illustrating a display associated with a remote capture device, where the display includes a grid having grid portions, and where each grid portion shows the back of a single deposit item therein before an image of the multiple deposit items is captured, in accordance with an embodiment of the present invention;

FIG. 8 is a block diagram illustrating technical components of a system for processing an image that shows multiple deposit items, where the image was captured by a remote capture device, in accordance with an embodiment of the present invention; and FIG. 9 is a mixed block and flow diagram illustrating a system for crediting an account based at least partially on a remotely captured image that shows multiple deposit items, in accordance with an embodiment of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the present invention are shown. Indeed, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, and/or operational aspects of any of the embodiments of the present invention described and/or contemplated herein may be included in any other embodiment of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may be embodied as an apparatus (including, for example, a system, machine, device, computer program product, and/or the like), as a method (including, for example, a business process, computer-implemented process, and/or the like), or as any combination of the foregoing. Accordingly, embodiments of the present invention may take the form of an entirely software embodiment (including firmware, resident software, micro-code, etc.), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of apparatuses and/or methods. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory and/or non-transitory computer-readable medium (e.g., a memory, etc.) that can direct a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator- and/or human-implemented steps in order to carry out an embodiment of the present invention.

In general terms, embodiments of the present invention relate to methods and apparatuses for processing an image, where the image shows multiple deposit items, and where the image was captured by a remote capture device. For example, some embodiments of the present invention are configured to identify, based at least partially on the image, deposit item information associated with the multiple deposit items shown in the image. As another example, some embodiments of the present invention are additionally configured to credit an account based at least partially on the deposit item information that was identified based at least partially on the image. As still another example, some embodiments of the present invention are configured to determine that a portion of the image represents at least part of the front or at least part of the back of a deposit item shown in the image. As a further example, some embodiments are configured to determine that a portion of a first image and a portion of a second image collectively represents at least part of a front and at least part of a back of the same deposit item. As another example, some embodiments are configured to enhance a portion of an unsatisfactory portion of an image that shows multiple deposit items and/or to prompt a remote capture device user to capture a second image to replace the unsatisfactory portion of the image. As yet another example, some embodiments of the present invention are configured to prompt a user of a remote capture device to capture an image that shows multiple deposit items relative to a grid. As such, each of the embodiments described and/or contemplated herein relate to remotely capturing images of multiple deposit items, such that those multiple deposit items can be deposited without the remote capture device user having to travel to a traditional deposit location.

Referring now to FIG. 1, a general process flow 100 of an apparatus for crediting an account based at least partially on an image that shows multiple deposit items is provided, in accordance with an embodiment of the present invention. As represented by the block 110, the apparatus is configured to receive an image that shows multiple deposit items, where the image was captured by a remote capture device. As represented by the block 120, the apparatus is also configured to identify, based at least partially on the image, deposit item information associated with the multiple deposit items. In addition, as represented by the block 130, the apparatus is configured to credit an account based at least partially on the deposit item information.

Accordingly, the apparatus having the process flow 100 enables a user of a remote capture device to deposit multiple deposit items in a single deposit transaction by capturing the image of the multiple deposit items with the remote capture device. As such, the user of the remote capture device can engage in a single deposit transaction that involves multiple deposit items without having to travel to a traditional deposit location (e.g., banking center, ATM, etc.) and without having to capture an individual image of each deposit item involved in the deposit transaction.

It will be understood that the apparatus having the process flow 100 (and/or the process flows 200, 300, 400, 500, 600, and/or 900, etc.) can include or be embodied as one or more separate apparatuses (e.g., the remote capture device 820 and/or the deposit server 830 shown in FIG. 8, etc.). For example, in some embodiments, one apparatus (e.g., the remote capture device 820, etc.) is configured to perform the portions of the process flow 100 represented by the block 110, and a second apparatus (e.g., the deposit server 830, etc.) is configured to perform the portions represented by the blocks 120-130. As another example, in some embodiments, one apparatus (e.g., the remote capture device 820, etc.) is configured to perform the portions of the process flow 100 represented by the blocks 110-120, and a second apparatus (e.g., the deposit server 830, etc.) is configured to perform the portion represented by the block 130. As still another example, in some embodiments, a single apparatus (e.g., the deposit server 830, etc.) is configured to perform each and every portion of the process flow 100. It will also be understood that, in some embodiments, a remote capture device (e.g., the remote capture device 820, etc.) is configured to perform one or more (or all) of the portions of the process flow 100, and that in some embodiments, that remote capture device is the remote capture device referred to in the block 110. Further, it will be understood that, in some embodiments, a first portion of an apparatus is configured to perform one or more portions of the process flow 100 and one or more other portions of the same apparatus are configured to perform the one or more other portions of the process flow 100. For example, in some embodiments, an image capturing device housed in a mobile phone is configured to perform the portion of the process flow 100 represented by the block 110, and a processor housed in the mobile phone and operatively connected to the image capturing device is configured to perform the portions of the process flow 100 represented by the blocks 120 and 130.

Regarding the block 110, the phrase "remote capture device," as used herein, refers to an apparatus that is configured to capture one or more images. It will be understood that, in some embodiments, the remote capture device refers to an apparatus that houses one or more electronic image sensors, digital cameras, and/or other image capturing devices. For example, in some embodiments, the remote capture device refers to a mobile phone having a digital camera housed therein. However, in other embodiments, the remote capture device refers to the image capturing device itself. Using the example above, in some embodiments, the remote capture device refers to the digital camera that is housed in the mobile phone. As a variation of this example, in still other embodiments, the remote capture device refers to a digital camera that is not housed in the mobile phone, but is instead located adjacent, near, and/or otherwise proximate to the mobile phone (e.g., located within arm's reach of the mobile phone, etc.) and is operatively connected to (e.g., via wireline and/or wireless connection) the mobile phone. Thus, it will be understood that the remote capture device can be embodied as an apparatus (e.g., a mobile phone that houses a digital camera, etc.), as a component of the apparatus (e.g., a digital camera housed in a mobile phone, etc.), or as a peripheral device associated with the apparatus (e.g., a digital camera operatively connected to and located proximately to a mobile phone, etc.).

In addition, it will also be understood that the remote capture device is so named because it is typically located remotely from a traditional deposit location, such as, for example, a financial institution, an ATM, and/or the like. Instead, the remote capture device is typically located in a home, an office, on a person, and/or away from a traditional deposit location. In addition, because the remote capture device is typically involved in the performance of the process flow 100 (e.g., because the apparatus having the process flow 100 includes and/or is embodied as the remote capture device, because the apparatus having the process flow 100 is operatively connected to the remote capture device, etc.), the remote capture device enables its user(s) to transform any location where the remote capture device is located into a deposit location. It will also be understood that the remote capture device is typically owned, operated, serviced, held, carried, possessed, controlled, and/or maintained (collectively referred to herein as "maintained" for simplicity) by a customer of a financial institution (e.g., a customer of the financial institution that maintains the account referred to in the block 130, a customer of a different financial institution, etc.).

Examples of remote capture devices include, but are not limited to, cameras (e.g., digital cameras, video cameras, webcams, etc.), scanners (e.g., flatbed scanners, handheld scanners, etc.), mobile phones (e.g., feature phones, smart phones, camera phones, etc.), personal digital assistants (PDAs), tablet computers, portable media players, electronic image sensors (e.g., charge coupled devices (CCD), complementary metal-oxide-semiconductor (CMOS) sensors, etc.), as well as, in some embodiments, one or more components thereof and/or one or more peripheral devices associated therewith. Of course, it will be understood that, in some embodiments, the remote capture device is configured to perform one or more other functions (e.g., sending and/or receiving one or more communications, etc.) in addition to capturing one or more images. It will be further understood that, in some embodiments, the remote capture device refers to a wireline, non-portable, and/or non-handheld device, such as, for example, a flatbed scanner and/or a webcam. However, in other embodiments, the remote capture device refers to a wireless, portable, and/or handheld device, such as, for example, a digital camera, handheld scanner, and/or mobile phone.

Further regarding the block 110, it will be understood that the phrase "multiple deposit items," as used herein, refers to two or more deposit items. It will be understood that each of the deposit items shown in the image may not be shown in their entirety. For example, in some embodiments, the image may show the entire front of a first deposit item but only 75% of the front of a second deposit item and only 65% of the back of a third deposit item. Also, it will be understood that the multiple deposit items can all be the same type, or the multiple deposit items can be different types. Examples of types of deposit items include, but are not limited to, checks (e.g., personal checks, business checks, cashier's checks, credit card convenience checks, etc.), money orders, deposit slips, and/or the like.

Still further regarding the block 110, it will be understood that the apparatus having the process flow 100 can be configured to receive the image in any way. For example, in some embodiments, the apparatus is configured to receive the image because the apparatus having the process flow 100 is also configured to capture the image (i.e., the apparatus having the process flow 100 includes and/or is embodied as the remote capture device referred to in the block 110). As another example, in some embodiments, the apparatus having the process flow 100 is configured to receive the image in one or more communications from a separate apparatus (e.g., from a remote capture device located remotely from and operatively connected to the apparatus having the process flow 100, etc.). It will be understood that, in such embodiments, the apparatus having the process flow 100 can be configured to receive the image directly from the remote capture device and/or indirectly (i.e., via one or more separate apparatuses) from the remote capture device.

Regarding the block 120, it will be understood that the term "identify," as used herein, is meant to have its ordinary meaning (i.e., its ordinary dictionary definition) in addition to the one or more ordinary meanings of the following terms: discover, learn, calculate, observe, read, decide, determine, collect, conclude, verify, ascertain, and/or the like. Thus, in some embodiments, the apparatus having the process flow 100 is configured to identify deposit item information associated with the multiple deposit items by reading the deposit item information associated with the multiple deposit items directly from the image. For example, in some embodiments, the apparatus is configured to identify that a deposit amount associated with one deposit item in the multiple deposit items is $100 because "$100" appears on the deposit item shown in the image. However, in other embodiments, the apparatus having the process flow 100 is not able to read the deposit item information directly from the image and must determine that information in another way. For example, in some embodiments, the apparatus having the process flow 100 is configured to identify first deposit item information by comparing second deposit item information that is shown in the image to information that is, for example, stored in a datastore. As a specific example, in some embodiments, the apparatus having the process flow 100 is configured to identify a payee identity that is not shown in the image by comparing a MICR line that is shown in the image to account information that is stored in an account datastore (e.g., the account datastore 838 shown in FIG. 8, etc.).

As another example, in some embodiments where the deposit item information referred to in the block 120 includes the number of the multiple deposit items, the apparatus having the process flow 100 is configured to identify the number of the multiple deposit items based at least partially on the apparatus identifying the number of quadrilaterals shown in the image. As still another example, in some embodiments where the deposit item information referred to in the block 120 includes the number of the multiple deposit items, the apparatus having the process flow 100 is configured to identify the number of the multiple deposit items based at least partially on the apparatus identifying the number of the MICR lines shown in the image. As another example, in some embodiments, the apparatus having the process flow 100 is configured to identify the deposit item information based at least partially on one or more inputs provided by the user of the remote capture device. For example, in some embodiments, the apparatus having the process flow 100 is configured to receive (and/or prompt the user of the remote capture device for) information associated with at least one of the number of the multiple deposit items, the type of at least one of the deposit items in the multiple deposit items, and/or the deposit amount of at least one of the deposit items in the multiple deposit items.

It will also be understood that the phrase "deposit item information associated with the multiple deposit items" refers to information associated with (e.g., information describing, information about, information identifying, etc.) any one or more of the deposit items in the multiple deposit items. Further, it will be understood that, in some embodiments, the deposit item information includes any information shown on a deposit item itself, such as, for example, information associated with a MICR line, endorsement, watermark, account number, payee identity, payor identity, financial institution identity, deposit amount, and/or the like. However, in other embodiments, the deposit item information additionally or alternatively includes information associated with the appearance (e.g., size, shape, color, texture, etc.) of a deposit item, the type of a deposit item (e.g., business check, money order, etc.), the number of multiple deposit items (i.e., the number of the multiple deposit items shown in the image), and/or the like. It will also be understood that, in some embodiments, the deposit item information identified for each of the deposit items in the multiple deposit item is the same type of deposit item information (e.g., the deposit amount for each deposit item, etc.), whereas, in other embodiments, the type of deposit item information identified is different for one or more of the deposit items in the multiple deposit items (e.g., the deposit amount for the first deposit item, the MICR line for the second deposit item, etc.).

As referred to herein, it will be understood that a MICR line is a line of characters having a standardized font (e.g., E-13B and CMC-7), location, and size that is typically printed in magnetic ink and/or toner at or near the bottom of a deposit item. For example, some countries, such as the United States, Canada, Japan, Australia, Columbia, Venezuela, and the United Kingdom, have adopted E-13B as the standardized font for the MICR line, while other countries, such as Brazil, France, and several other European countries, have adopted CMC-7 as the standardized font for the MICR line. In the United States, the standards for the MICR line are developed and mandated by the American National Standards Institute (ANSI). In many instances, the characters in the MICR line include a routing number and an account number that can be used to identify the payor bank and the payor's bank account at the payor bank from which the funds will be drawn.

Further regarding the block 120, it will also be understood that, in some embodiments, the apparatus having the process flow 100 is configured to identify the deposit item information shortly after receiving the image. For example, in some embodiments where the remote capture device referred to in the block 110 is configured to perform the portions of the process flow 100 represented by the blocks 110 and 120, the remote capture device is configured to identify the deposit item information within moments, seconds, and/or minutes (e.g., within approximately 5 minutes, etc.) of capturing the image and/or within moments, second, and/or minutes of receiving the image from the image capturing device associated with the remote capture device. It will also be understood that, in some embodiments, the apparatus having the process flow 100 is configured to identify the deposit item information automatically (i.e., without human intervention). However, in other embodiments, the apparatus having the process flow 100 is configured to receive (and/or prompt for) at least some deposit item information from the user of the remote capture device.

Regarding the block 130, it will be understood that the apparatus having the process flow 100 is configured to credit the account in any known way. For example, in some embodiments, the apparatus having the process flow 100 is configured to transfer funds from a payor account identified in the deposit item information, in an amount identified in the deposit item information, and to a payee account identified in the deposit item information. It will also be understood that, in some embodiments, the apparatus having the process flow 100 includes and/or is embodied as an apparatus configured to receive financial transaction information (e.g., from individual transactions, from a batch of transaction information, etc.) and/or initiate, execute, complete, and/or otherwise facilitate the execution of those financial transactions. In some embodiments where the apparatus having the process flow 100 includes and/or is embodied as a server operatively connected to the remote capture device referred to in the block 110, the server is configured to credit the account itself. However, in other embodiments where the apparatus having the process flow 100 includes and/or is embodied as the remote capture device referred to the block 110, the remote capture device is configured to either credit the account itself or transmit the deposit item information to a server that is configured to credit the account.

It will further be understood that the apparatus having the process flow 100 can be configured to perform any of the portions of the process flow 100 represented by the blocks 110-130 upon or after one or more triggering events (which, in some embodiments, is one or more of the other portions of the process flow 100). As used herein, it will be understood that a "triggering event" refers to an event that automatically triggers the execution, performance, and/or implementation of a triggered action, either immediately, nearly immediately, or sometime after (e.g., within minutes, etc.) the occurrence of the triggering event. For example, in some embodiments, the apparatus having the process flow 100 is configured such that the apparatus identifying the deposit item information (the triggering event) automatically and immediately or nearly immediately triggers the apparatus to credit the account (the triggered action). In some embodiments, the apparatus having the process flow 100 is additionally or alternatively configured to automatically identify the deposit item information (triggered action) immediately or nearly immediately after receiving the image (triggering event).

Also, it will be understood that, in some embodiments, a predetermined time and/or the passage of a predetermined period of time may serve to trigger one or more of the portions represented by the blocks 110-130. It will also be understood that, in accordance with some embodiments, the apparatus having the process flow 100 is configured to automatically perform one or more of the portions of the process flow 100 represented by the blocks 110-130, whereas in other embodiments, one or more of the portions of the process flow 100 represented by the blocks 110-130 require and/or involve human intervention. Of course, in addition to the apparatus having the process flow 100, it will be understood that any of the embodiments described and/or contemplated herein can involve one or more triggering events, triggered actions, automatic actions, and/or human actions.

In addition, it will be understood that, in some embodiments, the apparatus having the process flow 100 (and/or a user thereof) is configured to perform each portion of the process flow 100, from start to finish, within moments, seconds, and/or minutes (e.g., within approximately 10-15 minutes, etc.). In some embodiments, the apparatus having the process flow 100 can be configured to perform one or more portions of the process flow 100 in real time, in substantially real time, and/or at one or more predetermined times. Further, it will be understood that the number, order, and/or content of the portions of the process flow 100 are exemplary and may vary.

It will also be understood that the apparatus having the process flow 100 (like all of the other apparatuses described herein) can be configured to perform one or more additional and/or alternative functions. For example, in some embodiments, the apparatus having the process flow 100 is configured to capture the image that shows the multiple deposit items (e.g., because the apparatus having the process flow 100 includes and/or is embodied as the remote capture device referred to in the block 110). As another example, in some embodiments, the apparatus is configured to prompt a user of the remote capture device to provide, to the remote capture device and/or to the apparatus having the process flow 100, deposit item information (e.g., the number of the multiple deposit items, deposit amounts, types of the multiple deposit items, payee identities, etc.) associated with the multiple deposit items before, after, or substantially simultaneous with capturing an image of the multiple deposit items.

As still another example, in some embodiments, the apparatus having the process flow 100 is configured to prompt a user of the remote capture device to arrange the multiple deposit items in a predetermined configuration (e.g., lay on a flat surface, in a line, in a 4×3 grid, etc.) before capturing an image of the multiple deposit items. As a further example, in some embodiments where the apparatus having the process flow 100 includes the remote capture device referred to in the block 110 and a deposit server (e.g., the deposit server 830 illustrated in FIG. 8, etc.), the remote capture device, after capturing/receiving the image and identifying the deposit item information therein, is configured to transmit the deposit item information to the deposit server located remotely from the remote capture device, so that the deposit server can credit the account based at least partially on the deposit item information. It will further be understood that the apparatus having the process flow 100 can be configured to perform any one or more of the portions of any one or more of the embodiments described and/or contemplated herein, including, for example, any one or more of the portions of the process flows 200, 300, 400, 500, 600, and/or 900 described later herein.

Referring now to FIG. 2, a general process flow 200 of an apparatus for determining that a portion of an image represents at least part of the front or at least part of the back of a deposit item is provided, in accordance with an embodiment of the present invention. It will be understood that the process flow 200 is generally the same as the process flow 100, except that the process flow 200 includes determining that a portion of the image represents at least part of the front or at least part of the back of a single deposit item in the multiple deposit items (sometimes referred to herein as the "front/back determination" for simplicity), as represented by the block 230. It will be understood that, in some embodiments, the apparatus having the process flow 200 is configured to make the front/back determination based at least partially on the apparatus identifying deposit item information from that portion of the image. For example, in some embodiments, the apparatus having the process flow 200 is configured to determine that the portion of the image represents at least part of the front of a single deposit item based at least partially on the apparatus identifying a MICR line in that portion of the image. As another example, in some embodiments, the apparatus having the process flow 200 is configured to determine that a portion of the image represents at least part of the back of a single deposit item based at least partially on the apparatus identifying an endorsement in that portion of the image.

Referring now to FIG. 3, a general process flow 300 of an apparatus for determining that a portion of a first image and a portion of a second image collectively represents at least part of the front and at least part of the back of a single deposit item is provided, in accordance with an embodiment of the present invention. As represented by the block 310, the apparatus having the process flow 300 is configured to receive a first image that shows multiple deposit items, where the first image was captured by a remote capture device. As represented by the block 320, the apparatus is also configured to receive a second image that shows the multiple deposit items, where the second image was captured by the remote capture device. Then, as represented by the block 330, the apparatus is configured to determine that a first portion of the first image and a first portion of the second image collectively represents at least part of the front and at least part of the back of a first deposit item in the multiple deposit items. In addition, as represented by the block 340, the apparatus having the process flow 300 is also configured to determine that a second portion of the first image and a second portion of the second image collectively represents at least part of the front and at least part of the back of a second deposit item in the multiple deposit items. For simplicity, the portions of the process flow 300 represented by the blocks 330 and 340 are sometimes referred to herein as "collective front and back determinations."

Regarding the blocks 310 and 320, it will be understood that the apparatus having the process flow 300 is configured to perform these portions of the process flow in generally the same way as the apparatus having the process flow 100 is configured to perform the portion of the process flow represented by the block 110. In addition, it will be understood that at least some of the multiple deposit items shown in the first image are the same as the multiple deposit items shown in the second image. Also, it will be understood that, in some embodiments, the first image shows at least part of the fronts of each of the multiple deposit items, whereas the second image shows at least part of the backs of each of the multiple deposit items (and/or vice versa). However, in other embodiments, the first image and the second image each shows at least part of the front of a deposit item and at least part of the back of another deposit item. Further, it will be understood that, between the first and the second images, at least part of the front of a deposit item is shown and at least part of the back of the same deposit item is shown, thereby collectively capturing at least part of the front and at least part of the back of the same deposit item.

Regarding the blocks 330 and 340, the apparatus having the process flow 300 is configured, in some embodiments, to make a collective front and back determination based at least partially on input received from a user of the remote capture device (e.g., via the remote capture device, etc.). For example, in some embodiments, the apparatus having the process flow 300 is configured to receive information about the position of the front of a deposit item shown in the first image and information about the position the back of the same deposit item shown in the second image.

Additionally or alternatively, in some embodiments, the apparatus having the process flow 300 is configured to make a collective front and back determination by determining that deposit item information shown in a portion of the first image corresponds to (e.g., matches, is associated with, etc.) deposit item information shown in a portion of the second image. For example, in some embodiments, the apparatus is configured to make a collective front and back determination by determining that the size of a deposit item (e.g., the size of a business check, etc.) shown in the first image corresponds the size of a deposit item shown in the second image. As another example, in some embodiments, the apparatus having the process flow 300 is configured to make a collective front and back determination by determining that an identifier (e.g., a watermark, a logo, etc.) located on a deposit item shown in the first image corresponds to an identifier located on a deposit item shown in the second image. As still another example, in some embodiments, the apparatus is configured to make a collective front and back determination based at least partially on determining that a signature located on a deposit item shown in the first image corresponds to a payee identity located on a deposit item shown in the second image.

It will be understood that the apparatus having the process flow 300 (like all of the other apparatuses described herein) can be configured to perform one or more additional or alternative functions. For example, in some embodiments, the apparatus having the process flow 300 is additionally configured to: (a) prompt a user of the remote capture device to capture the first image of the multiple deposit items; and (b) prompt the user to capture the second image of the multiple deposit items. In some embodiments, the apparatus can be further configured to: (a) prompt the user to capture the first image of the multiple deposit items, such that the first image shows the fronts of each of the multiple deposit items; and (b) prompt the user to capture the second image of the multiple deposit items, such that the second image shows the backs of each of the multiple deposit items.

Referring now to FIG. 4, a general process flow 400 of an apparatus for enhancing an unsatisfactory portion of an image is provided, in accordance with an embodiment of the present invention. Like the apparatus having the process flow 100 described in connection with FIG. 1, the apparatus having the process flow 400 is configured to receive an image that shows multiple deposit items, where the image was captured by a remote capture device, as represented by the block 110 in the process flow 400. As represented by the block 420, the apparatus having the process flow 400 is also configured to determine that a first portion of the image is satisfactory for identifying deposit item information therein. As represented by the block 430, the apparatus is further configured to determine that a second portion of the image is unsatisfactory for identifying deposit item information therein. As represented by the block 440, the apparatus having the process flow 400 is also configured to enhance the second portion of the image, resulting in an enhanced image portion. Finally, as represented by the block 450, the apparatus is configured to determine that the enhanced image portion is satisfactory for determining deposit item information therein.

Regarding the blocks 420 and 430, the terms "satisfactory" and "unsatisfactory," as used herein, typically refer to the quality of the one or more portions of the image and/or to whether the apparatus having the process flow 400 can identify deposit item information in, from, and/or based at least partially on those one or more image portions. For example, in some embodiments, the apparatus having the process flow 400 is configured to determine that the quality of the second portion of the image is such that deposit item information cannot be identified therein. In such embodiments, the second portion of the image may be upside down, unfocused, blurry, distorted, discolored, darkened, too small, and/or otherwise unreadable.

Regarding the block 440, the term "enhance," as used herein, typically refers to at least partially changing a portion of the image such that the apparatus having the process flow 400 can identify deposit item information in, from, and/or based at least partially on the resulting enhanced image portion. For example, in some embodiments, the apparatus having the process flow 400 is configured to enhance the second portion of the image by focusing, cropping, orienting, sizing, scaling, shaping, and/or coloring the second portion of the image. As another example, in some embodiments, the apparatus is configured to enhance the second portion of the image by creating a bi-tonal image of that portion, by correcting the geometry of that portion, by converting that portion to grayscale, by creating a binarized image of that portion, and/or the like. Accordingly, it will be understood that, in some embodiments, the apparatus having the process flow 400 is configured to enhance one or more portions of the image that are unsatisfactory (to the apparatus having the process flow 400) for identifying deposit item information therein while leaving alone the one or more other portions of the image that are satisfactory (to the apparatus having the process flow 400) for identifying deposit item information therein. Of course, in other embodiments, the apparatus having the process flow 400 is configured to enhance the one or more satisfactory portions of the image (in the same way or in a different way)

before, after, or substantially simultaneous with the apparatus enhancing the one or more unsatisfactory portions of the image.

In some embodiments, the apparatus having the process flow 400 is configured to identify the one or more unsatisfactory portions of the image and/or to enhance the one or more unsatisfactory portions of the image by using one or more MICR lines shown in the image. For example, in some embodiments, the apparatus having the process flow 400 is configured to determine whether the apparatus can read one or more of the MICR lines shown in the image. If not (e.g., because the MICR line(s) are too small, too dark, blurry, etc.), the apparatus can be configured to enhance one or more portions of the image (e.g., by enlarging, lightening, focusing those image portions, etc.) until the apparatus can read those one or more MICR lines.

As another example, in some embodiments, the apparatus having the process flow 400 is configured to determine whether a MICR line shown in the image is within a predefined distance from an edge of a deposit item shown in the image. For example, the apparatus may determine whether the MICR line is within a predefined distance from the bottom edge of the deposit item and/or whether the MICR line is contained within a predefined distance from any edge of the deposit item. In one exemplary embodiment, the predefined distance is a distance within the range of a half inch and two and a half inches, inclusive, such as, for example, one and a half inches. In another embodiment, the predefined distance is approximately one and a half inches.

Based on determining whether the MICR line is within a predetermined distance from an edge of the deposit item shown in the image, the apparatus having the process flow 400 can be configured to determine, for example, the orientation of the deposit item shown in the image. As an example, in some embodiments, the apparatus is configured to determine that a deposit item is "upside down" in the image (and/or that the image is upside down) based at least partially on determining that a MICR line is located near the top of a deposit item shown in the image. Accordingly, the apparatus can be configured to enhance the portion of the image that shows the upside down deposit item (and/or enhance the entire upside down image) by correcting the orientation (e.g., by reorienting and/or rotating, etc.) of the unsatisfactory image portion (and/or the entire image). In this way, the apparatus having the process flow 400 can be configured to determine the "top" and "bottom" of a deposit item shown in the image and correct one or more portions of the image (if needed) based at least partially on these determination(s). It will also be understood that the apparatus having the process flow 400 can be configured to determine what deposit item information is located "above" and "below" the MICR line by determining where the MICR line is relative to an edge of a deposit item shown in the image.

Further, like the apparatus having the process flow 100, it will be understood that the apparatus having the process flow 400 can be configured to identify deposit item information associated with the multiple deposit items based at least partially on one or more satisfactory portions of the image and/or based at least partially on one or more enhanced portions of the image. In some embodiments, the apparatus having the process flow 400 is further configured to credit an account based at least partially on this deposit item information.

In addition, in some embodiments, the apparatus is configured to identify the deposit item information associated with the one or more satisfactory image portions and/or credit the account based at least partially thereon, all before and/or simultaneous with the apparatus enhancing the one or more unsatisfactory portions of the image. As such, the apparatus having the process flow 400 can be configured to initiate, execute, complete, and/or otherwise facilitate the deposit of the one or more deposit items shown in the satisfactory portions of the image before and/or simultaneous with enhancing the one or more unsatisfactory portions of the image that show the one or more other deposit items. This particular feature means that the apparatus having the process flow 400 can be configured to initiate, execute, complete, and/or otherwise facilitate the deposit transaction involving the multiple deposit items without requiring the user of the remote capture device to capture another image of one or more of the multiple deposit items.

Of course, it will be understood that, in some embodiments, the apparatus having the process flow 400 is configured to identify the deposit item information associated with the one or more satisfactory portions of the image and/or credit the account based at least partially thereon, all after the apparatus enhances the one or more unsatisfactory portions of the image. In addition, in some embodiments, the apparatus having the process flow 400 is configured to credit the account based at least partially on the deposit item information associated with the enhanced image portion before, after, or substantially simultaneous with crediting the account based at least partially on the deposit item information associated with the satisfactory portion of the image.

It will also be understood that, in some embodiments, in addition to or instead of enhancing the second portion of the image, an apparatus of the present invention is configured to perform one or more other functions based at least partially on determining that the second portion of the image is unsatisfactory for determining deposit item information therein. For example, referring now to FIG. 5, a general process flow 500 of an apparatus for prompting a user of a remote capture device to capture a second image to replace an unsatisfactory portion of a first image is provided, in accordance with an embodiment of the present invention. Like the apparatus having the process flow 100 described in connection with FIG. 1, the apparatus having the process flow 500 is configured to receive an image that shows multiple deposit items, where the image was captured by a remote capture device, as represented by the block 110 in the process flow 500. Like the apparatus having the process flow 400 described in connection with FIG. 4, the apparatus having the process flow 500 is configured to determine that a first portion of the image is satisfactory for identifying deposit item information therein, as represented by the block 420 in the process flow 500. Also like the apparatus having the process flow 400, the apparatus having the process flow 500 is configured to determine that a second portion of the image is unsatisfactory for identifying deposit item information therein, as represented by the block 430 in the process flow 500. Additionally, the apparatus having the process flow 500 is configured to prompt a user of the remote capture device to capture a second image to replace the second portion of the image, such that the second image is satisfactory for identifying deposit item information therein, as represented by the block 540. Additionally, in some embodiments, the apparatus having the process flow 500 is further configured to determine that the second image is satisfactory for determining deposit item information therein.

Regarding the block 540, it will be understood that the apparatus having the process flow 500 can be configured to prompt the user of the remote capture device in any way. For example, in some embodiments, the apparatus is configured to communicate one or more instructions (e.g., on a display associated with a remote capture device, through a speaker associated with the remote capture device, etc.), such that the one or more instructions notify the user that the second portion of the image is unsatisfactory (to the apparatus having the process flow 500) for identifying deposit item information therein and/or to notify the user that a second image is needed to replace the unsatisfactory second portion of the image. Thus, it will be understood that the apparatus having the process flow 500 is configured to prompt the remote capture device user to correct the defects in the second portion of the image by capturing the second image.

It will also be understood that, in some embodiments, the second portion of the image shows a blurry, unfocused, and/or otherwise unsatisfactory image of one or more deposit items. Thus, it will be understood that, in accordance with some embodiments, the apparatus having the process flow 500 is configured to prompt the user to capture a second image that shows a clear, focused, and/or otherwise satisfactory image of the same one or more deposit items that were unsatisfactorily shown in the second portion of the original image. Further, it will be understood that, in some embodiments, the apparatus having the process flow 500 is configured to identify deposit item information based at least partially on the satisfactory first portion of the image and/or credit an account based at least partially on that deposit item information, all before and/or simultaneous with the apparatus prompting the user to capture the second image to replace the unsatisfactory second portion of the first image. Of course, it will be understood that, in some embodiments, the apparatus having the process flow 500 is configured to identify the deposit item information associated with the one or more satisfactory portions of the image and/or credit the account based at least partially thereon, all after the apparatus prompts the user to capture the second image to replace the second portion of the first image. In addition, in some embodiments, the apparatus having the process flow 500 is configured to credit the account based at least partially on the deposit item information associated with the second image before, after, or substantially simultaneous with crediting the account based at least partially on the deposit item information associated with the first portion of the first image.

Referring now to FIG. 6, a general process flow 600 of an apparatus for prompting a user of a remote capture device to capture an image that shows multiple deposit items relative to a grid is provided, in accordance with an embodiment of the present invention. As represented by the block 610, the apparatus having the process flow 600 is configured to display a grid on a display associated with a remote capture device, where the grid includes a plurality of grid portions. As represented by the block 620, the apparatus having the process flow 600 is also configured to prompt a user of the remote capture device to arrange the multiple deposit items, and/or to position and/or operate the remote capture device, such that each deposit item appears in a single grid portion of the display before capturing an image of the multiple deposit items. Additionally, like the apparatus having the process flow 100 described in connection with FIG. 1, the apparatus having the process flow 600 is also configured to receive an image that shows the multiple deposit items, where the image was captured by the remote capture device, as represented by the block 110 in the process flow 600.

It will be understood that, in some embodiments, the user of the remote capture device can arrange the multiple deposit items (e.g., in a 3×2 grid on a flat surface, etc.), such that each of the deposit items appears within a single grid portion of the display. In other embodiments, the user of the remote capture device can additionally or alternatively position the remote capture device (e.g., by moving the remote capture device relative to the multiple deposit items, etc.), such that each of the deposit items appears within a single grid portion of the display. In still other embodiments, the user of the remote capture device can additionally or alternatively operate the remote capture device (e.g., by operating a zoom, focus, and/or other feature associated with the remote capture device, etc.), such that each of the multiple deposit items appears within a single grid portion of the display.

It will be understood that prompting the user of the remote capture device to position the multiple deposit items, and/or to position and/or operate the remote capture device, as described above can have several benefits. For example, in some embodiments, the apparatus having the process flow 600 can more easily identify deposit item information associated with the multiple deposit items if that apparatus knows where and/or how each deposit item will appear in the image (e.g., where the apparatus expects each deposit item to appear in a corresponding grid portion, etc.). In addition, prompting the user of the remote capture device to ensure that a single deposit item appears in a single grid portion increases the probability that the resulting captured image will not show overlapping deposit items, disoriented deposit items, and/or the like. As such, it will be understood that the grid used by the apparatus having the process flow 600 facilitates the processing of the image that shows the multiple deposit items, in addition to helping the user of the remote capture device properly capture that image.

It will also be understood that, in some embodiments, the apparatus having the process flow 600 is configured to prompt the user of the remote capture device to provide the number of the multiple deposit items, and then to display a number of grid portions on the display based at least partially on the number provided by the user. In other embodiments, the apparatus having the process flow 600 is additionally or alternatively configured to display a number of grid portions on the display based at least partially on a resolving power (e.g., number of pixels, pixel density, lens strength, etc.) associated with the remote capture device. Like the other apparatuses described and/or contemplated herein, it will be understood that the apparatus having the process flow 600 can include and/or be embodied as the remote capture device referred to in the block 610. Similarly, the apparatus having the process flow 600 can additionally or alternatively include and/or be embodied as a server located remotely from the remote capture device referred to in the block 610.

Referring now to FIGS. 7 and 7A, a display 700 associated with a remote capture device is provided, in accordance with a more-detailed embodiment of the present invention. It will be understood that the display 700 represents an exemplary embodiment of the display referred to the process flow 600. Accordingly, the display 700 includes a grid 710 that has four grid portions 711, 713, 715, and 717 included therein. It will be understood that the number and shape of the grid portions 711-717 shown in FIGS. 7 and 7A are exemplary and may vary. For example, in other embodiments, the display associated with the remote capture device may be configured to display five grid portions in a 5×1 (or 1×5) configuration on the display. As another example, in some embodiments, a display is configured to display one or more circular, triangular, square, and/or oval-shaped grid portions, instead of, or in addition to, the grid portions shown in FIGS. 7 and 7A. In addition, it will be understood that, in accordance with some embodiments, a first grid portion shown in a display associated with a remote capture device can have a different size, shape, orientation, etc. than a second grid portion shown in the same display.

As shown in FIG. 7, the display 700 shows the fronts of four checks 712, 714, 716, and 718, where each check front appears in a single grid portion of the display 700. It will be understood that FIG. 7 shows the fronts of the checks 712-718 as those checks appear in the display 700 before an image of those check fronts is captured by the remote capture device associated with the display 700. As shown in FIG. 7A, the display 700 shows the backs of the same four checks 712-718 that were shown in FIG. 7, and each check back also appears in a single grid portion of the display 700. It will be further understood that FIG. 7A shows the backs of the checks 712-718 as those checks appear in the display 700 before an image of those check backs is captured by the remote capture device associated with the display 700.

In accordance with some embodiments, a user of the remote capture device associated with the display 700 places the checks 712-718 on a flat surface and operates and/or positions the remote capture device, such that each of the check fronts appears in a corresponding single grid portion of the display 700, as shown in FIG. 7 (i.e., the checks are lying face up, are arranged in a 2×2 grid, are oriented the same way, and are not overlapping). Then, the user captures an image with the remote capture device, where the image shows the fronts of the checks 712-718 in generally the same way as those check fronts appear in FIG. 7. Thereafter, the remote capture device user flips the checks over on the flat surface and operates and/or positions the remote capture device, such that each of the check backs appears in a single grid portion of the display 700, as shown in FIG. 7A (i.e., the checks are lying face down, are arranged in the 2×2 grid, are oriented in the same way, and are not overlapping). Then, the user captures a second image with the remote capture device, where the image shows the backs of the checks 712-718 in generally the same way as those check backs appear in FIG. 7A.

It will be understood that the apparatus that processes the first and second images described above (i.e., the apparatus having the process flow 600) can be configured to determine that a check front shown in the first image corresponds to a check back shown in the second image based at least partially on determining that the check front and the check back were positioned in the same grid portion of the display 700 before the first and second images were captured by the remote capture device. That apparatus can be additionally or alternatively configured to determine that a check front corresponds to a check back based at least partially on determining that the check front is positioned in the first image in generally the same location as the position of the check back in the second image.

In other embodiments, the apparatus that processes the first and second images can be configured to determine that a check front corresponds to a check back based at least partially on one or more indications received from the user of the remote capture device that captured the first and second images. For example, the apparatus can receive (and/or prompt for) one or more indications from the user that describe at least some of the positions of the check fronts and at least some of the positions of the corresponding check backs in the first and second images. For example, if the front of the check 712 is positioned in the grid portion 711 for the first image (i.e., as shown in FIG. 7), and the back of the check 712 is positioned in the grid portion 717 for the second image (i.e., where the back of the check 718 is shown in FIG. 7A), the remote capture device user can indicate these positions to the apparatus that processes the first and second images, thereby facilitating the execution of the deposit transaction.

In some alternative embodiments of the present invention, the user of the remote capture device can also use one or more physical and/or tangible objects to arrange and/or facilitate the arrangement of the checks before one or more images of the checks are captured. For example, in some embodiments, the user inserts (and/or is prompted by an apparatus (e.g., the apparatus having the process flow 600, etc.) to insert) each of the checks for deposit into corresponding sleeves of a transparent jacket, thereby ensuring that the checks are arranged in a predetermined (e.g., grid-like, etc.) configuration and/or that the one or more images will not show any overlapping checks. In accordance with such embodiments, instead of being said to illustrate the display 700 associated with a remote capture device, FIGS. 7 and 7A can be said to illustrate the transparent jacket 700 having the plurality of sleeves 711, 713, 715, and 717, such that each sleeve carries a check (i.e., one of the checks 712-718) therein. In such embodiments, once each check is inserted into a corresponding sleeve, the remote capture device user can: (a) capture a first image of the transparent jacket having the checks positioned therein; (b) flip the transparent jacket over; and (c) capture a second image of the transparent jacket having the checks positioned therein, thereby ensuring, between the first and second images, that the front and the back of each check in the jacket is captured. In some embodiments, instead of flipping the jacket over, the user of the remote capture device can flip each check over within its corresponding sleeve before capturing the second image. In addition, it will be understood that, in accordance with some embodiments, the transparent jacket is used along with the display 700 having the grid 710 shown in FIG. 7, but that in other embodiments, the transparent jacket is used instead of the display to arrange the checks for remote capture.

Also, in some embodiments, the apparatus that processes the first and second images of the checks shown in the transparent jacket can be configured to determine that a check front corresponds to a check back based at least partially on determining that the check front in the first image is positioned in the same sleeve as the check back in the second image. In some embodiments, the phrase "same sleeve" means that a sleeve shown in the first image is positioned in the same location in the second image (e.g., where the user does not flip the jacket over but does flip each check over within its corresponding sleeve, etc.). However, in other embodiments, the phrase "same sleeve" means that the second image is a mirror image of the first image, such that, for example, a sleeve positioned in the upper left hand corner of the first image is positioned in the upper right hand corner of the second image (e.g., where the user flips the transparent jacket over instead of flipping each check over within its corresponding sleeve, etc.).

Referring now to FIG. 8, a system 800 is provided for processing an image that shows multiple deposit items, where the image was captured by a remote capture device, in accordance with an embodiment of the present invention. As illustrated, the exemplary system 800 includes a network 810, a remote capture device 820, and a deposit server 830. Also shown are a remote capture device user 805 and an image 807 that shows the checks 801, 802, and 803 (i.e., the multiple deposit items). It will be understood that each of the checks 801, 802, and 803 includes the deposit amounts 811, 812, and 813 of $25, $75, and $150, respectively, and that each of the checks 801, 802, and 803 also includes deposit item information that is not shown (e.g., information associated with a payee identity, an account number, a MICR line, etc.). Also, it will be understood that the remote capture device user 805 has access to the remote capture device 820 and to the checks 801, 802, and 803. It will further be understood that user 805 captured the image 807 by using the remote capture device 820. In addition, it will be understood that, in this example, the user 805 intends to deposit the sum of the deposit amounts

811, 812, and 813 (i.e., $250) into the checking account 809. It will also be understood that the checking account 809 is associated with the user 805 and is maintained by a bank (not shown) for the benefit of that user 805, who is a customer of that bank. Still further, it will be understood that, in this example, the remote capture device 820 is maintained by the remote capture device user 805, and that the deposit server 830 is maintained by the same bank that maintains the checking account 809.

As shown in FIG. 8, the remote capture device 820 and the deposit server 830 are each operatively and selectively connected to the network 810, which may include one or more separate networks. In addition, the network 810 may include one or more interbank networks, telephone networks, telecommunication networks, local area networks (LANs), wide area networks (WANs), and/or global area networks (GANs) (e.g., the Internet, etc.). It will also be understood that the network 810 may be secure and/or unsecure and may also include wireless and/or wireline technology.

The remote capture device 820 may include any computerized apparatus that can be configured to perform any one or more of the functions of the remote capture device 820 described and/or contemplated herein. It will also be understood that the remote capture device 820 can include and/or be embodied as any remote capture device described and/or contemplated herein. As illustrated in FIG. 8, in accordance with some embodiments of the present invention, the remote capture device 820 includes a communication interface 822, a processor 824, a memory 826 having a remote capture application 827 stored therein, an image capturing device 828, and a user interface 829. In such embodiments, the processor 824 is operatively and selectively connected to the communication interface 822, the user interface 829, the image capturing device 828, and the memory 826.

Each communication interface described herein, including the communication interface 822, generally includes hardware, and, in some instances, software, that enables a portion of the system 800, such as the remote capture device 820, to send, receive, and/or otherwise communicate information to and/or from the communication interface of one or more other portions of the system 800. For example, the communication interface 822 of the remote capture device 820 may include a modem, network interface controller (NIC), network adapter, network interface card, and/or some other electronic communication device that operatively connects the remote capture device 820 to another portion of the system 800, such as, for example, the deposit server 830.

Each processor described herein, including the processor 824, generally includes circuitry for implementing the audio, visual, and/or logic functions of that portion of the system 800. For example, the processor may include a digital signal processor device, a microprocessor device, and/or various analog-to-digital converters, digital-to-analog converters, and/or other support circuits. Control and signal processing functions of the apparatus in which the processor resides may be allocated between these one or more devices according to their respective capabilities. The processor may also include functionality to operate one or more software programs based at least partially on computer-executable program code portions thereof, which may be stored, for example, in a memory device, such as in the remote capture application 827 of the memory 826 of the remote capture device 820.

Each memory device described herein, including the memory 826 for storing the remote capture application 827 and other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus.

As shown in FIG. 8, the memory 826 includes the remote capture application 827. It will be understood that, in some embodiments, the remote capture application 827 is configured to initiate, execute, complete, and/or otherwise facilitate any one or more portions of any one or more embodiments described and/or contemplated herein, such as, for example, one or more of the portions of the process flow 100 described herein. For example, in some embodiments, the remote capture application 827 is configured to receive an image (e.g., the image 807, etc.) that shows multiple deposit items (e.g., the checks 801, 802, and 803, etc.) and/or to identify, based at least partially on the image, deposit item information (e.g., the deposit amounts 811, 812, and 813, etc.) associated with the multiple deposit items. As another example, in some embodiments, the remote capture application 827 is additionally or alternatively configured to credit an account (e.g., the account 809, etc.) based at least partially on the deposit item information associated with the multiple deposit items.

As still another example, in some embodiments, the remote capture application 827 is configured to determine that a portion of an image represents at least part of the front or at least part of the back of a single deposit item, and/or that a portion of a first image and a portion of a second image collectively represents at least part of the front and at least part of the back of a single deposit item. As a further example, in some embodiments, the remote capture application 827 is configured to determine whether an image is satisfactory for identifying deposit item information therein. In some embodiments, the remote capture application 827 is configured to enhance a portion of an image (e.g., any one or more portions of the image 807, etc.), resulting in an enhanced image portion that is satisfactory for identifying deposit item information therein.

In some embodiments, the remote capture application 827 is additionally or alternatively configured to perform one or more functions other than those previously described herein. For example, in some embodiments, the remote capture application 827 is configured to require the user 805 to identify and/or authenticate himself/herself to the remote capture application 827 before the remote capture application 827 will initiate, execute, complete, and/or otherwise facilitate any of the functions described and/or contemplated herein. For example, in some embodiments, the remote capture application 827 is configured to identify and/or authenticate the user 805 based at least partially on an username/password, personal identification number (PIN), smart card, token (e.g., USB token, etc.), biometric information, and/or some other information and/or device that the user 805 provides to the remote capture application 827. Additionally or alternatively, in some embodiments, the remote capture application 827 is configured to identify and/or authenticate the user 805 by using one-, two-, or multi-factor identification and/or authentication. For example, in some embodiments, the remote capture application 827 requires two-factor authentication, such that the remote capture device user 805 must provide the correct smart card and enter the correct PIN in order to authenticate the user 805 to the remote capture application 827.

It will also be understood that, in some embodiments, the remote capture application 827 is configured to enable the remote capture device user 805 and/or the remote capture device 820 to communicate with one or more other portions of the system 800, and/or vice versa. In some embodiments, the remote capture application 827 is configured to access an online banking account. Further it will be understood that, in some embodiments, the remote capture application 827 is created, provided, controlled, and/or maintained by the bank that maintains the deposit server 830 and/or by an individual or business (not shown). For example, in some embodiments, the remote capture device 820 is embodied as a smartphone, and the remote capture application 827 is embodied as an "app" that was created by a bank and/or by a software maker for execution on the smartphone. Also, it will be understood that, in some embodiments, the remote capture application 827 includes one or more computer-executable program code portions for instructing the processor 824 to perform one or more of the functions of the remote capture application 827 and/or of the remote capture device 820 described and/or contemplated herein. In some embodiments, the remote capture application 827 may include and/or use one or more network and/or system communication protocols.

Also shown in FIG. 8 is the image capturing device 828, which may include an electronic image sensor, a digital camera, and/or some other image capturing device, including any one or more of the image capturing devices described and/or contemplated herein. It will also be understood that the image capturing device 828 can include and/or be embodied as one or more image capturing devices. It will further be understood that the image capturing device 828 is configured to capture one or more images (e.g., the image 807, etc.) and/or communicate those one or more images to the processor 824. In some embodiments, the image capturing device 828 can be configured to take still images and/or video. Additionally or alternatively, in some embodiments, the image capturing device 828 includes one or more features, including, but not limited to, a zoom, focus, flash, and/or the like. In some embodiments, the image capturing device 828 has a resolving power, which, for example, defines the detail and/or resolution with which an image can be captured by the image capturing device 828. In some embodiments, the resolving power associated with the image capturing device 828 is measured in the number of pixel sensors (sometimes referred to merely as "pixels") used by the image capturing device 828 in order to capture the image.

It will also be understood that the remote capture device 820 also includes the user interface 829. The user interface 829 can include and/or be embodied as one or more user interfaces. In some embodiments, the user interface 829 includes one or more user output devices for presenting information to the remote capture device user 805. In some embodiments, the user interface 829 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, and/or the like for receiving information from the remote capture device user 805.

FIG. 8 also illustrates the deposit server 830, in accordance with an embodiment of the present invention. The deposit server 830 may include any computerized apparatus that can be configured to perform any one or more of the functions of the deposit server 830 described and/or contemplated herein. In some embodiments, for example, the deposit server 830 includes and/or is embodied as one or more servers, mainframes, engines, network devices, front end systems, back end systems, and/or the like. In some embodiments, such as the one illustrated in FIG. 8, the deposit server 830 includes a communication interface 832, a processor 834, and a memory 836, which includes a deposit application 837 and an account datastore 838 stored therein. As shown, the communication interface 832 is operatively and selectively connected to the processor 834, which is operatively and selectively connected to the memory 836.

It will be understood that, in some embodiments, the deposit application 837 is configured to initiate, execute, complete, and/or otherwise facilitate one or more of the portions of one or more of the embodiments described and/or contemplated herein, such as, for example, one or more of the portions of the process flows 100 and/or 200 described herein. For example, in some embodiments, the deposit application 837 is configured to receive an image that shows multiple deposit items (e.g., the image 807 that shows the checks 801, 802, and 803, etc.) and/or to identify, based at least partially on the image, deposit item information associated with the multiple deposit items (e.g., the deposit amounts 811, 812, and 813, etc.). As another example, in some embodiments, the deposit application 837 is additionally or alternatively configured to credit an account (e.g., the account 809, etc.) based at least partially on the deposit item information associated with the multiple deposit items. As still another example, in some embodiments, the deposit application 837 is configured to determine that a portion of an image represents at least part of the front or at least part of the back of a single deposit item, and/or that a portion of a first image and a portion of a second image collectively represents at least part of the front and at least part of the back of a single deposit item. As such, it will be understood that, in accordance with some embodiments, the deposit application 837 can be configured to perform any one or more of the functions previously described herein as being performed by the remote capture application 827 (and/or vice versa).

It will also be understood that, in some embodiments, the deposit application 837 is configured to enable the deposit server 830 to communicate with one or more other portions of the system 800, such as, for example, the account datastore 838 and/or the remote capture device 820, and/or vice versa. It will further be understood that, in some embodiments, the deposit application 837 is configured to initiate, execute, complete, and/or otherwise facilitate one or more financial transactions and/or to maintain one or more financial accounts (e.g., the checking account 809, etc.) stored in the account datastore 838. In some embodiments, the deposit application 837 includes one or more computer-executable program code portions for instructing the processor 834 to perform one or more of the functions of the deposit application 837 and/or deposit server 830 described and/or contemplated herein. In some embodiments, the deposit application 837 may include and/or use one or more network and/or system communication protocols.

In addition to the deposit application 837, the memory 836 also includes the account datastore 838. It will be understood that the account datastore 838 can be configured to store any type and/or amount of information. For example, in some embodiments, the account datastore 838 includes information associated with one or more transactions, financial accounts, and/or the like. In some embodiments, the account datastore 838 may also store any information related to processing images captured by remote capture devices. In some embodiments, the account datastore 838 additionally or alternatively stores information associated with online banking and/or online banking accounts.

It will be understood that the account datastore 838 may include any one or more storage devices, including, but not limited to, datastores, databases, and/or any of the other storage devices typically associated with a computer system. It will also be understood that the account datastore 838 may store information in any known way, such as, for example, by using one or more computer codes and/or languages, alphanumeric character strings, data sets, figures, tables, charts, links, documents, and/or the like. Further, in some embodiments, the account datastore 838 may include information associated with one or more applications, such as, for example, the deposit application 837. It will also be understood that, in some embodiments, the account datastore 838 provides a real-time or near real-time representation of the information stored therein, so that, for example, when the processor 834 accesses the account datastore 838, the information stored therein is current or nearly current.

Of course, it will be understood that the embodiment illustrated in FIG. 8 is exemplary and that other embodiments may vary. For example, in some embodiments, some or all of the portions of the system 800 are combined into a single portion. Specifically, in some embodiments, the remote capture device 820 and the deposit server 830 are combined into a single remote capture and deposit device that is configured to perform all of the same functions of those separate portions as described and/or contemplated herein. Likewise, in some embodiments, some or all of the portions of the system 800 are separated into two or more distinct portions. In addition, the various portions of the system 800 may be maintained by the same or separate parties. For example, in some embodiments, a bank may maintain the deposit server 830, whereas the remote capture device user 805 may maintain the remote capture device 820. However, in other embodiments, a bank may maintain both the deposit server 830 and the remote capture device 820.

It will also be understood that the system 800 (and/or one or more portions of the system 800) may include and/or implement any embodiment of the present invention described and/or contemplated herein. For example, in some embodiments, the system 800 (and/or one or more portions of the system 800) is configured to implement any one or more of the embodiments of the process flow 100 described and/or contemplated herein in connection with FIG. 1, any one or more of the embodiments of the process flow 200 described and/or contemplated herein in connection with FIG. 2, any one or more of the embodiments of the process flow 300 described and/or contemplated herein in connection with FIG. 3, any one or more of the embodiments of the process flow 400 described and/or contemplated herein in connection with FIG. 4, any one or more of the embodiments of the process flow 500 described and/or contemplated herein in connection with FIG. 5, any one or more of the embodiments of the process flow 600 described and/or contemplated herein in connection with FIG. 6, any one or more of the embodiments described and/or contemplated herein in connection with FIG. 7, and/or any one or more of the embodiments of the system 900 described and/or contemplated herein in connection with FIG. 9.

As a specific example, in accordance with an embodiment of the present invention, (1) the remote capture device 820 is configured to receive the image 807 that shows the multiple deposit items 801, 802, and 803, where the image 807 was captured by the remote capture device 820, as represented by the block 110 in FIG. 1; (2) the remote capture device 820 is configured to identify, based at least partially on the image 807, the deposit item information 811, 812, and 813 associated with the multiple deposit items 801, 802, and 803, as represented by the block 120; and (3) the deposit server 830 is configured to credit the account 809 based at least partially on the deposit item information 811, 812, and 813, as represented by the block 130. It will be understood that, in accordance with some embodiments, the remote capture device 820 and the deposit server 830 are each configured to send and/or receive information (e.g., one or more images, messages, instructions, etc.) to and/or from each other, such that information sent from a first apparatus to a second apparatus can trigger that second apparatus to perform one or more portions of any one or more of the embodiments described and/or contemplated herein.

Referring now to FIG. 9, a mixed block and flow diagram of a system 900 is provided, in accordance with a more-detailed embodiment of the present invention. It will be understood that the system 900 is configured to credit an account based at least partially on a remotely captured image that shows multiple deposit items. It will also be understood that the system 900 includes a remote capture device 901 (e.g., the remote capture device 820 in FIG. 8, etc.) and a deposit server 903 (e.g., the deposit server 830, etc.), where the remote capture device 901 is operatively connected to the deposit server 903. It will further be understood that, in this embodiment, a user (not shown) positions and/or operates the remote capture device 901 to capture one or more images that show the multiple deposit items (not shown in FIG. 9) and to transmit those one or more images to the deposit server 903, all in order to initiate, execute, complete, and/or otherwise facilitate the deposit of the deposit amounts associated with the multiple deposit items into an account associated with the user.

As represented by the block 905, the remote capture device 901 prompts the user to indicate (to the remote capture device 901) the number of the multiple deposit items for deposit and the deposit amount for each deposit item in the multiple deposit item. Then, as represented by the block 910, the remote capture device 901 prompts the user to capture a first image that shows the fronts of the multiple deposit items. Thereafter, the user operates the remote capture device 901 to capture the first image that shows the fronts of the multiple deposit items. After the first image is captured, the remote capture device prompts the user to capture a second image that shows the backs of the multiple deposit items, as represented by the block 920. Then, as represented by the block 925, the user operates the remote capture device 901 to capture the second image that shows the backs of the multiple deposit items. After the first and second images are captured, the remote capture device 901 determines that the first image and the second image are satisfactory for identifying deposit item information therein, as represented by the block 930. Thereafter, the remote capture device 901 transmits the first image and the second image to the deposit server 903 for additional processing, as represented by the block 935.

After receiving the first and second images from the remote capture device 901, the deposit server 903 identifies deposit item information (e.g., information associated with a MICR line, deposit amount, payee identity, endorsement, etc.) therein, as represented by the block 940. Then, as represented by the block 945, the deposit server 903 determines which portions of the first image correspond to which portions of the second image based at least partially on the deposit item information identified therein. Finally, as represented by the block 950, the deposit server 903 credits an account based at least partially on the deposit item information identified from the first and second images.

Of course, it will be understood that the embodiment illustrated in FIG. 9 is exemplary and that other embodiments may vary. For example, in some embodiments, instead of the deposit server 903, the remote capture device 901 is configured to identify the deposit item information from the first and second images and/or determine which portions of the first image correspond to which portions of the second image. As another example, in some embodiments, the remote capture device 901 is only configured to capture the first image, capture the second image, and transmit the first and second images to the deposit server 903, and the deposit server 903 is configured to perform one or more of the other portions of the process flow shown in FIG. 9. As still another example, in some embodiments, the system 900 includes one or more apparatuses in addition to the remote capture device 901 and the deposit server 903, where those one or more additional apparatuses are configured to perform one or more of the portions of the process flow shown in FIG. 9 and/or one or more additional or alternative functions. In addition, it will be understood that the system 900 (and/or one or more portions of the system 900) may include and/or implement any embodiment of the present invention described and/or contemplated herein.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
a processor configured to:
receive an image that shows multiple deposit items, wherein the image was captured by a remote capture device;
determine a first portion of the image is satisfactory for identifying deposit item information associated with a first deposit item from the multiple deposit items;
retain the first portion of the image;
determine a second portion of the image is not satisfactory for identifying deposit item information associated with a second deposit item from the multiple deposit items;
in response to determining the second portion of the image is not satisfactory for identifying deposit item information associated with the second deposit item, prompt recapture of the second portion of the image;
in response to determining the recaptured second portion of the image is satisfactory for identifying deposit item information associated with the second deposit item, replace the second portion of the image with the recaptured second portion of the image;
identify, based at least partially on the image, deposit item information associated with the multiple deposit items; and
determine, based at least partially on the deposit item information identified, that a portion of the image represents at least part of the front or at least part of the back of a single deposit item in the multiple deposit items;
wherein a determination that the portion of the image represents at least part of the front of a single deposit item is based at least partially on identification of an MICR line shown in the portion of the image;
wherein a determination that the portion of the image represents at least part of the back of a single deposit item is based at least partially on identification of an endorsement shown in the portion of the image.

2. The apparatus of claim 1, wherein the remote capture device comprises at least one of a mobile phone, a digital camera, a portable scanner, or a component thereof.

3. The apparatus of claim 1, wherein the multiple deposit items comprise at least one of a check, a deposit slip, or a money order.

4. The apparatus of claim 1, wherein the deposit item information comprises information associated with at least one of a MICR line, an endorsement, a watermark, an account number, a payee identity, a payor identity, a financial institution identity, a deposit amount, an appearance of a deposit item, a type of a deposit item, or the number of the multiple deposit items.

5. The apparatus of claim 1, wherein the processor is housed in the remote capture device.

6. The apparatus of claim 1, wherein the processor is housed in a server located remotely from the remote capture device.

7. The apparatus of claim 1, wherein the deposit item information comprises the number of the multiple deposit items, and wherein the processor is configured to identify the number of the multiple deposit items based at least partially on the processor identifying the number of quadrilaterals shown in the image.

8. The apparatus of claim 1, wherein the deposit item information comprises the number of the multiple deposit items, and wherein the processor is configured to identify the number of the multiple deposit items based at least partially on the processor identifying the number of MICR lines shown in the image.

9. The apparatus of claim 1, wherein the processor is configured to:
prompt a user of the remote capture device to capture a first image of the multiple deposit items that shows the fronts of the multiple deposit items; and
prompt the user of the remote capture device to capture a second image of the multiple deposit items that shows the backs of the multiple deposit items.

10. The apparatus of claim 1, wherein the processor is configured to prompt a user of the remote capture device to provide the number of the multiple deposit items.

11. The apparatus of claim 1, wherein the processor is configured to prompt a user of the remote capture device to provide the type of at least one of the deposit items in the multiple deposit items.

12. The apparatus of claim 1, wherein the processor is configured to prompt a user of the remote capture device to provide the deposit amount of at least one of the deposit items in the multiple deposit items.

13. The apparatus of claim 1, wherein the processor is configured to prompt a user of the remote capture device to arrange the multiple deposit items in a predetermined configuration before capturing the image.

14. The apparatus of claim 1, wherein the image comprises a first image, and wherein the processor is configured to:
receive a second image of the multiple deposit items, wherein the second image was captured by the remote capture device;
determine that the first portion of the first image and a first portion of the second image collectively represents at least part of the front and at least part of the back of the first deposit item in the multiple deposit items; and determine that the second portion of the first image and a second portion of the second image collectively represents at least part of the front and at least part of the back of the second deposit item in the multiple deposit items.

15. The apparatus of claim 14, wherein the processor is configured to determine that the first portion of the first image and the first portion of the second image collectively represents at least part of the front and at least part of the back of the first deposit item based at least partially on input received from a user of the remote capture device via the remote capture device.

16. The apparatus of claim 14, wherein the processor is configured to determine that the first portion of the first image and the first portion of the second image collectively represents at least part of the front and at least part of the back of the first deposit item by determining that deposit item information shown in the first portion of the first image corresponds to deposit item information shown in the first portion of the second image.

17. The apparatus of claim 1, wherein the processor is configured to transmit the deposit item information to a server located remotely from the processor, wherein the server is configured to credit an account based at least partially on the deposit item information.

18. The apparatus of claim 1, wherein the processor is configured to credit an account based at least partially on the deposit item information.

19. A method comprising:
receiving, by a processor, an image that shows multiple deposit items, wherein the image was captured by a remote capture device;
determining a first portion of the image is satisfactory for identifying deposit item information associated with a first deposit item from the multiple deposit items;
retaining the first portion of the image;
determining a second portion of the image is not satisfactory for identifying deposit item information associated with a second deposit item from the multiple deposit items;
in response to determining the second portion of the image is not satisfactory for identifying deposit item information associated with the second deposit item, prompting recapture of the second portion of the image;
in response to determining the recaptured second portion of the image is satisfactory for identifying deposit item information associated with the second deposit item, replacing the second portion of the image with the recaptured second portion of the image;
identifying, using the processor and based at least partially on the image, deposit item information associated with the multiple deposit items; and
determining, based at least partially on the deposit item information identified, that a portion of the image represents at least part of the front or at least part of the back of a single deposit item in the multiple deposit items;
wherein a determination that the portion of the image represents at least part of the front of a single deposit item is based at least partially on identification of an MICR line shown in the portion of the image;
wherein a determination that the portion of the image represents at least part of the back of a single deposit item is based at least partially on identification of an endorsement shown in the portion of the image.

20. The method of claim 19, further comprising:
capturing, by the remote capture device, the image that shows the multiple deposit items.

21. The method of claim 19, wherein the processor is housed in the remote capture device.

22. The method of claim 19, wherein the processor is housed in a server located remotely from the remote capture device.

23. The method of claim 19, wherein identifying the deposit item information associated with the multiple deposit items comprises:
identifying the number of quadrilaterals shown in the image; and
identifying the number of the multiple deposit items based at least partially on the number of the quadrilaterals.

24. The method of claim 19, wherein identifying the deposit item information associated with the multiple deposit items comprises:
identifying the number of MICR lines shown in the image; and
identifying the number of the multiple deposit items based at least partially on the number of the MICR lines.

25. The method of claim 19, further comprising:
prompting a user of the remote capture device to capture a first image of the multiple deposit items that shows the fronts of the multiple deposit items; and
prompting the user of the remote capture device to capture a second image of the multiple deposit items that shows the backs of the multiple deposit items.

26. The method of claim 19, further comprising:
prompting a user of the remote capture device to provide the number of the multiple deposit items.

27. The method of claim 19, further comprising:
prompting a user of the remote capture device to provide the type of at least one of the deposit items in the multiple deposit items.

28. The method of claim 19, further comprising:
prompting a user of the remote capture device to provide the deposit amount of at least one of the deposit items in the multiple deposit items.

29. The method of claim 19, further comprising:
prompting a user of the remote capture device to arrange the multiple deposit items in a predetermined configuration before capturing the image.

30. The method of claim 19, wherein the image comprises a first image, and wherein the method further comprises:
receiving, by the processor, a second image of the multiple deposit items, wherein the second image was captured by the remote capture device;
determining, using the processor, that the first portion of the first image and a first portion of the second image collectively represents at least part of the front and at least part of the back of the first deposit item in the multiple deposit items; and
determining, using the processor, that the second portion of the first image and a second portion of the second image collectively represents at least part of the front and at least part of the back of the second deposit item in the multiple deposit items.

31. The method of claim 19, further comprising:
transmitting the deposit item information to a server located remotely from the processor, wherein the server is configured to credit an account based at least partially on the deposit item information.

32. The method of claim 19, further comprising:
crediting, by the processor, an account based at least partially on the deposit item information.

33. A computer program product comprising a non-transitory computer-readable medium, wherein the non-transitory computer-readable medium comprises computer-executable program code portions stored therein, wherein the computer-executable program code portions comprise:
- a first program code portion configured to receive an image that shows multiple deposit items, wherein the image was captured by a remote capture device;
- a second program code portion configured to:
  - determine a first portion of the image is satisfactory for identifying deposit item information associated with a first deposit item from the multiple deposit items;
  - retain the first portion of the image;
  - determine a second portion of the image is not satisfactory for identifying deposit item information associated with a second deposit item from the multiple deposit items;
  - in response to determining the second portion of the image is not satisfactory for identifying deposit item information associated with the second deposit item, prompt recapture of the second portion of the image;
  - in response to determining the recaptured second portion of the image is satisfactory for identifying deposit item information associated with the second deposit item, replace the second portion of the image with the recaptured second portion of the image;
  - identify, based at least partially on the image, deposit item information associated with the multiple deposit items; and
- a third program code portion configured to determine, based at least partially on the deposit item information identified, that a portion of the image represents at least part of the front or at least part of the back of a single deposit item in the multiple deposit items;
  - wherein a determination that the portion of the image represents at least part of the front of a single deposit item is based at least partially on identification of an MICR line shown in the portion of the image;
  - wherein a determination that the portion of the image represents at least part of the back of a single deposit item is based at least partially on identification of an endorsement shown in the portion of the image.

34. The computer program product of claim 33, wherein the second code portion is configured to:
- identify the number of MICR lines shown in the image; and
- identify the number of the multiple deposit items based at least partially on the number of the MICR lines.

35. The computer program product of claim 33, further comprising:
- a fourth program code portion configured to prompt a user of the remote capture device to capture a first image of the multiple deposit items that shows the fronts of the multiple deposit items; and
- a fifth program code portion configured to prompt the user of the remote capture device to capture a second image of the multiple deposit items that shows the backs of the multiple deposit items.

36. The computer program product of claim 33, further comprising:
- a fourth program code portion configured to prompt a user of the remote capture device to provide the number of the multiple deposit items.

37. The computer program product of claim 33, further comprising:
- a fourth program code portion configured to prompt a user of the remote capture device to provide the deposit amount of at least one of the deposit items in the multiple deposit items.

38. The computer program product of claim 33, wherein the image comprises a first image, and wherein the computer program product further comprises:
- a fourth program code portion configured to receive a second image of the multiple deposit items, wherein the second image was captured by the remote capture device;
- a fifth program code portion configured to determine that the first portion of the first image and a first portion of the second image collectively represents at least part of the front and at least part of the back of the first deposit item in the multiple deposit items; and
- a sixth program code portion configured to determine that the second portion of the first image and a second portion of the second image collectively represents at least part of the front and at least part of the back of the second deposit item in the multiple deposit items.

* * * * *